US010644353B2

(12) United States Patent
Matsuoka et al.

(10) Patent No.: US 10,644,353 B2
(45) Date of Patent: May 5, 2020

(54) NON-AQUEOUS SECONDARY BATTERY

(71) Applicant: Asahi Kasei Kabushiki Kaisha, Tokyo (JP)

(72) Inventors: Naoki Matsuoka, Tokyo (JP); Takehiro Koga, Tokyo (JP); Hitoshi Shobukawa, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 1370 days.

(21) Appl. No.: 14/352,864

(22) PCT Filed: Oct. 25, 2012

(86) PCT No.: PCT/JP2012/077629
§ 371 (c)(1),
(2) Date: Apr. 18, 2014

(87) PCT Pub. No.: WO2013/062056
PCT Pub. Date: May 2, 2013

(65) Prior Publication Data
US 2014/0255796 A1     Sep. 11, 2014

(30) Foreign Application Priority Data

Oct. 28, 2011 (JP) ................................ 2011-237706
Oct. 28, 2011 (JP) ................................ 2011-237707
(Continued)

(51) Int. Cl.
*H01M 10/0567* (2010.01)
*H01M 10/052* (2010.01)
(Continued)

(52) U.S. Cl.
CPC ..... *H01M 10/0567* (2013.01); *H01M 4/0445* (2013.01); *H01M 4/13* (2013.01);
(Continued)

(58) Field of Classification Search
None
See application file for complete search history.

(56) References Cited

U.S. PATENT DOCUMENTS 5,824,120 A * 10/1998 Mitchell ................. H01M 4/13
29/623.1
5,834,112 A * 11/1998 Muraoka ................ H01B 1/122
428/332
(Continued)

FOREIGN PATENT DOCUMENTS

CN     1788370 A     6/2006
CN     1799162 A     7/2006
(Continued)

OTHER PUBLICATIONS

Machine translation of JP2009123497, printed Jun. 11, 2017.*
(Continued)

*Primary Examiner* — Maria Laios
(74) *Attorney, Agent, or Firm* — Morgan, Lewis & Bockius LLP

(57) ABSTRACT

A non-aqueous secondary battery including an electrolyte solution that contains a lithium salt and a non-aqueous solvent, a positive electrode, and a negative electrode, wherein a basis weight of a positive-electrode active material layer included in the positive electrode is 8 to 100 mg/cm$^2$, and/or, a basis weight of a negative-electrode active material layer included in the negative electrode is 3 to 46 mg/cm$^2$, and wherein the electrolyte solution has an ion conductivity at 25° C. of 15 mS/cm or more.

26 Claims, 1 Drawing Sheet

(30) Foreign Application Priority Data

| Oct. 28, 2011 | (JP) | ................................ | 2011-237765 |
|---|---|---|---|
| Oct. 28, 2011 | (JP) | ................................ | 2011-237808 |
| Apr. 27, 2012 | (JP) | ................................ | 2012-103331 |

(51) Int. Cl.

| H01M 4/04 | (2006.01) |
|---|---|
| H01M 10/0568 | (2010.01) |
| H01M 4/139 | (2010.01) |
| H01M 10/0569 | (2010.01) |
| H01M 4/13 | (2010.01) |
| H01M 10/44 | (2006.01) |
| H01M 4/02 | (2006.01) |
| H01M 10/0525 | (2010.01) |
| H01M 10/42 | (2006.01) |
| H01M 4/131 | (2010.01) |
| H01M 4/133 | (2010.01) |
| H01M 4/62 | (2006.01) |

(52) U.S. Cl.
CPC ......... *H01M 4/139* (2013.01); *H01M 10/052* (2013.01); *H01M 10/0568* (2013.01); *H01M 10/0569* (2013.01); *H01M 10/446* (2013.01); *H01M 4/131* (2013.01); *H01M 4/133* (2013.01); *H01M 4/62* (2013.01); *H01M 10/0525* (2013.01); *H01M 2004/021* (2013.01); *H01M 2010/4292* (2013.01); *H01M 2300/0028* (2013.01); *H01M 2300/0037* (2013.01)

(56) References Cited

U.S. PATENT DOCUMENTS

| 6,048,372 | A * | 4/2000 | Mangahara | ............ | H01M 4/04 |
| | | | | | 29/623.5 |
| 6,302,928 | B1 * | 10/2001 | Xu | .......................... | H01M 4/04 |
| | | | | | 29/623.1 |
| 7,172,834 | B1 * | 2/2007 | Jow | ................... | H01M 10/0525 |
| | | | | | 252/519.2 |
| 2001/0023041 | A1 * | 9/2001 | Hayase | ................. | H01M 6/162 |
| | | | | | 429/303 |
| 2004/0013946 | A1 | 1/2004 | Abe et al. | | |
| 2005/0014070 | A1 | 1/2005 | Palanisamy et al. | | |
| 2005/0084765 | A1 * | 4/2005 | Lee | ....................... | H01M 4/366 |
| | | | | | 429/329 |
| 2006/0024577 | A1 * | 2/2006 | Schwake | ................ | H01G 9/038 |
| | | | | | 429/188 |
| 2006/0093914 | A1 * | 5/2006 | Tanaka | ................ | C01G 45/1242 |
| | | | | | 429/231.1 |
| 2007/0072086 | A1 | 3/2007 | Nakagawa | | |
| 2007/0231705 | A1 | 10/2007 | Ohzuku et al. | | |
| 2008/0083626 | A1 | 4/2008 | Kubo et al. | | |
| 2009/0029249 | A1 * | 1/2009 | Takami | ................. | H01M 4/366 |
| | | | | | 429/188 |
| 2010/0283429 | A1 | 11/2010 | Ofer et al. | | |

FOREIGN PATENT DOCUMENTS

| CN | 102055017 A | | 5/2011 | | |
|---|---|---|---|---|---|
| EP | 2634854 A1 | | 9/2013 | | |
| JP | S62-222577 A | | 9/1987 | | |
| JP | 06-052897 A | | 2/1994 | | |
| JP | H11-086907 A | | 3/1999 | | |
| JP | 2000-030746 A | | 1/2000 | | |
| JP | 3154719 B2 | | 4/2001 | | |
| JP | 3239267 B | | 10/2001 | | |
| JP | 2002-203609 A | | 7/2002 | | |
| JP | 2002-260633 A | | 9/2002 | | |
| JP | 2003-068365 A | | 3/2003 | | |
| JP | 2003-086249 A | | 3/2003 | | |
| JP | 2005-011594 A | | 1/2005 | | |
| JP | 2006-524913 A | | 11/2006 | | |
| JP | 2007-179883 A | | 7/2007 | | |
| JP | 2007-273405 A | | 10/2007 | | |
| JP | 2008-034193 A | | 2/2008 | | |
| JP | 2009-021134 A | | 1/2009 | | |
| JP | 2009-123497 | * | 4/2009 | .......... | H01M 10/052 |
| JP | 2009-123497 A | | 6/2009 | | |
| JP | 2009123497 A | * | 6/2009 | | |
| JP | 2009-266825 A | | 11/2009 | | |
| JP | 2010-528431 A | | 8/2010 | | |
| JP | 2011-091005 A | | 5/2011 | | |
| JP | 2011-134547 A | | 7/2011 | | |
| WO | 02/101869 A1 | | 12/2002 | | |

OTHER PUBLICATIONS

Machine translation of JP 2009-123497 A1 printed Mar. 27, 2018 (Year: 2018).*
European Search Report issued in related European Patent Application No. 12843297.8 dated Mar. 20, 2015.
Office Action issued in related Taiwanese Patent Application No. 101139646 dated Apr. 7, 2014.
International Search Report issued in corresponding International Patent Application No. PCT/JP2012/077629 dated Jan. 29, 2013.

* cited by examiner

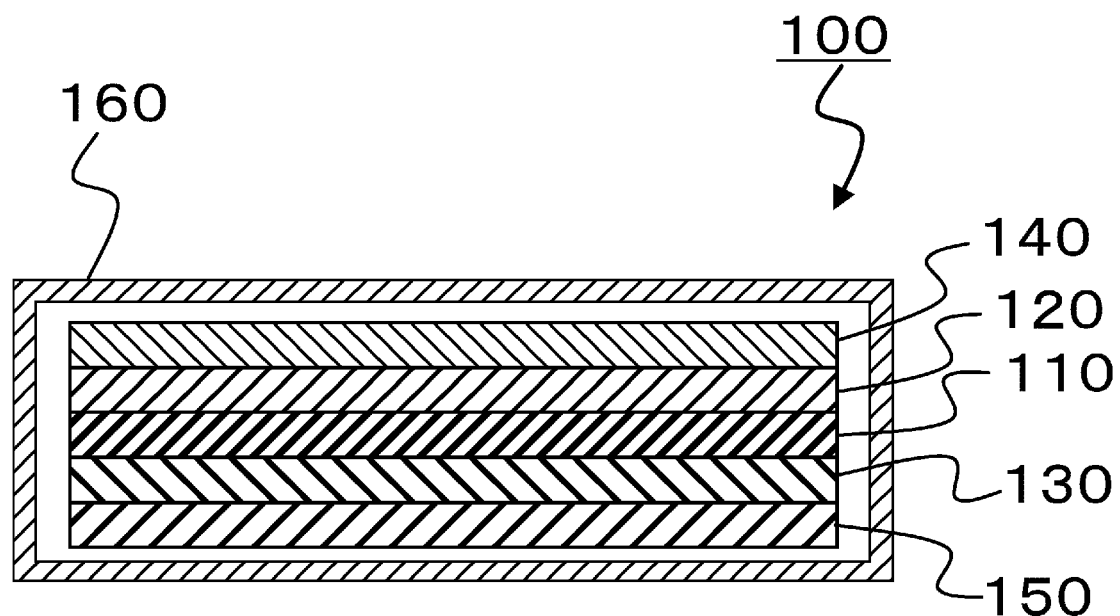

NON-AQUEOUS SECONDARY BATTERY

TECHNICAL FIELD

The present invention relates to a non-aqueous secondary battery.

BACKGROUND ART

A non-aqueous secondary battery that includes a non-aqueous electrolyte solution has the advantageous features of a light weight, a high energy, and a long life. Such a non-aqueous secondary battery is widely used as a power source in portable electronic devices, such as laptop computers, mobile phones, smartphones, tablet PCs, digital cameras, video cameras and the like. Further, with the progression toward a society that places less burden on the environment, non-aqueous secondary batteries are drawing attention as a power source for hybrid electric vehicles (hereinafter abbreviated as "HEVs"), plug-in HEVs (hereinafter abbreviated as "PHEVs"), and electric motorcycles, as well as in the field of power storage for household storage systems and the like.

When a non-aqueous secondary battery is mounted in a vehicle, such as an automobile, or in a household storage system, from perspectives such as cycling performance and long-term reliability under a high-temperature environment, the structural materials of the battery need to have excellent chemical and electrochemical stability, strength, corrosion resistance and the like. In addition, the conditions under which the battery is used largely differ from those for portable electronic device power sources. Since such power sources have to operate even in cold climates, a high rate performance and long-term stability under a low-temperature environment are also required as necessary properties.

On the other hand, to meet the needs for higher capacity and higher rate that are expected in the future, not only do materials need to be developed, but it is also necessary to construct the optimum state as a battery that enables each material to exhibit its functions sufficiently. Especially, if an electrode active material layer has a higher volumetric energy density, the diffusion pathway for the lithium ions becomes longer, which means that internal resistance resulting from the insertion and desorption of lithium ions increases. Therefore, to maintain a practical rate performance, a balanced design is necessary.

Generally, it is said that a higher capacity non-aqueous secondary battery can be achieved by improving the performance of the electrode active material. However, in practice, the production of an electrode active material layer having a high volumetric energy density is what is most important. For example, if a large amount of electrode mixture is coated on the electrode current collector, the electrode active material mass per unit volume of the battery becomes relatively greater than that of other battery materials, such as the current collector foil and the separator, that are not related to battery capacity, which means that a higher capacity as a battery can be obtained. Further, if the electrode is pressed at a high pressure, an electrode active material layer having a low porosity can be obtained, which similarly means that a higher capacity as a battery is realized.

When emphasizing the rate characteristic of a non-aqueous secondary battery, such as shortening the charging time, discharging at a large current, or discharging under a low-temperature environment, in contrast to when aiming for a higher capacity, it is necessary to design the electrode active material layer so that the diffusion pathway of the lithium ions is short. Specific examples to do this include reducing the basis weight of the electrode active material layer, increasing the porosity of the electrode active material layer and the like.

By the way, to improve the rate characteristic, it is also effective to select an electrolyte solution having a high ion conductivity. From a practical standpoint, it is desirable to use a non-aqueous electrolyte solution for the electrolyte solution of a lithium-ion secondary battery that operates at ordinary temperature. An example of a common solvent is the combination of a high-permittivity solvent, such as a cyclic carbonate, and a low-viscosity solvent, such as a lower chain carbonate. However, typical high-permittivity solvents have a high melting point, and depending on the type of electrolyte that is used, the rate characteristic, and the low-temperature characteristic can also be deteriorated. One solvent that overcomes this problem that has been proposed is a nitrile-based solvent that has an excellent balance between viscosity and relative permittivity. Among such solvents, acetonitrile is known to be a solvent that has an outstanding performance. However, since nitrile group-containing solvents also suffer from the fatal drawback that they undergo electrochemical reduction and decomposition, several improvement strategies have been reported.

For example, Patent Document 1 reports an electrolyte solution that is less affected by reduction and decomposition, which is obtained by mixing and diluting a cyclic carbonate, such as ethylene carbonate, and a nitrile-based solvent, such as acetonitrile. Further, Patent Document 2 to 4 report a battery that suppresses the reduction and decomposition of a nitrile-based solvent by using a negative electrode that has a higher reduction potential than that of the nitrile-based solvent. In addition, Patent Document 5 reports a non-aqueous electrolyte solution obtained by adding sulfur dioxide and one or more other aprotic polar solvents to a nitrile-based solvent for the purpose of forming a protective film on the negative electrode.

CITATION LIST

Patent Document

Patent Document 1: Japanese Patent No. 3154719
Patent Document 2: Japanese Patent Application Laid-Open No. 2009-21134
Patent Document 3: Japanese Patent No. 3239267
Patent Document 4: Japanese Patent Application Laid-Open No. 2007-273405
Patent Document 5: National Publication of International Patent Application No. 2010-528431

SUMMARY OF INVENTION

Technical Problem

However, for the electrolyte solution described in Patent Document 1, there is no suggestion of how to solve issues relating to the high-temperature durability performance, so that when continuously used under a high-temperature environment, there is a high likelihood that the battery will proceed to degrade and the capacity of the battery be substantially decreased, or that charging/discharging per se will become impossible. Further, if the negative electrode described in Patent Document 2 to 4 is used, the advantageous feature of a lithium-ion secondary battery, of having a high voltage, is forfeited. In addition, regarding Patent Document 5, since a very highly reactive gas is used as an additive, not only is the addition itself very difficult, but self-discharge during charging and storage is unavoidable. Still further, when the gas volatilizes, the battery interior becomes pressurized. Consequently, there are very important unresolved issues in terms of practical use, such as swelling and in even some cases rupturing of the battery.

On the other hand, although all of these known technologies focus on the reduction and decomposition of a nitrile-based solvent at the negative electrode, and still have several issues remaining to be resolved, it is thought that such technologies can be employed as a secondary battery if the issues regarding the negative electrode reactions can be resolved. However, for example, there is no mention whatsoever about the fact that internal resistance increases a lot more than in a conventional lithium-ion secondary battery even when the negative electrodes described in Patent Documents 2 and 4 are used, namely, when the charging/discharging cycle is repeated under conditions in which reduction and decomposition at the negative electrode cannot occur. Although such an increase in internal resistance has to be considered as being due to a factor other than reduction and decomposition at the negative electrode, the optimum construction as a battery has still not been found. To meet the needs for higher capacity and higher rate, further improvements are required.

It is an object of the present invention, which was made in view of the above-described circumstances, to provide a non-aqueous secondary battery that realizes a high rate performance even when designed with an electrode active material layer having a high volumetric energy density.

Solution to Problem

As a result of diligent research into solving the above-described problems, the present inventors discovered that a non-aqueous secondary battery that uses a specific non-aqueous electrolyte solution having an ion conductivity at 25° C. of 15 mS/cm or more can realize a high rate performance even when designed with an electrode active material layer having a high volumetric energy density, thereby completing the present invention.

Namely, the present invention is as follows.

[1] A non-aqueous secondary battery comprising an electrolyte solution that contains a lithium salt and a non-aqueous solvent, a positive electrode, and a negative electrode, wherein a basis weight of a positive-electrode active material layer included in the positive electrode is 8 to 100 mg/cm$^2$, and/or, a basis weight of a negative-electrode active material layer included in the negative electrode is 3 to 46 mg/cm$^2$, and wherein the electrolyte solution has an ion conductivity at 25° C. of 15 mS/cm or more.

[2] The non-aqueous secondary battery according to [1], wherein the electrolyte solution has an ion conductivity at 25° C. of 50 mS/cm or less.

[3] The non-aqueous secondary battery according to [1] or [2], wherein the basis weight of the positive-electrode active material layer included in the positive electrode is 24 to 100 mg/cm$^2$, and/or, the basis weight of the negative-electrode active material layer included in the negative electrode is 10 to 46 mg/cm$^2$.

[4] The non-aqueous secondary battery according to any of [1] to [3], wherein an electrode active material layer included in at least one of the positive electrode or the negative electrode has a porosity of 20 to 45%.

[5] The non-aqueous secondary battery according to any of [1] to [4], wherein the positive-electrode active material layer included in the positive electrode has a porosity of 20 to 45%.

[6] The non-aqueous secondary battery according to any of [1] to [5], wherein the negative-electrode active material layer included in the negative electrode has a porosity of 20 to 45%.

[7] The non-aqueous secondary battery according to any of [1] to [6], wherein the non-aqueous solvent includes a nitrile-based solvent.

[8] The non-aqueous secondary battery according to [7], wherein the nitrile-based solvent includes acetonitrile.

[9] The non-aqueous secondary battery according to [8], wherein a content of acetonitrile in the non-aqueous solvent is 5 to 97 vol. %.

[10] The non-aqueous secondary battery according to [8], wherein a content of acetonitrile in the non-aqueous solvent is 25 to 80 vol. %.

[11] The non-aqueous secondary battery according to any of [8] to [10], wherein the electrolyte solution contains acetonitrile, a lithium salt, and one or more compounds selected from the group consisting of compounds represented by the following formula (1).

(wherein $R^1$ and $R^2$ each independently represent an alkyl group optionally substituted with an aryl group or a halogen atom, or an aryl group optionally substituted with an alkyl group or a halogen atom, or $R^1$ and $R^2$ are bonded to each other to form a cyclic structure that may have an unsaturated bond with A, wherein A represents a divalent group having a structure represented by any one of the following formulae (2) to (6)).

[Formula 1]

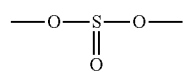 (2)

 (3)

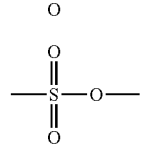 (4)

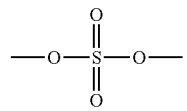 (5)

 (6)

[12] The non-aqueous secondary battery according to [11], wherein the compound represented by the above formula (1) is one or more compounds selected from the group consisting of ethylene sulfite, propylene sulfite, butylene sulfite, pentene sulfite, sulfolane, 3-methylsulfolane, 3-sulfolene, 1,3-propane sultone, 1,4-butane sultone, 1,3-propanediol sulfate, and tetramethylene sulfoxide.

[13] The non-aqueous secondary battery according to [11] or [12], wherein the electrolyte solution further contains one or more compounds selected from the group consisting of cyclic carbonates having a carbon-carbon double bond.

[14] The non-aqueous secondary battery according to any of [1] to [13], wherein the lithium salt is an inorganic lithium salt having a fluorine atom.

[15] The non-aqueous secondary battery according to [14], wherein the inorganic lithium salt is $LiPF_6$.

[16] The non-aqueous secondary battery according to [14], wherein the inorganic lithium salt is $LiBF_4$.

[17] The non-aqueous secondary battery according to any of [14] to [16], wherein a content of the inorganic lithium salt based on a total amount of the electrolyte solution is 0.1 to 40 mass %.

[18] The non-aqueous secondary battery according to any of [14] to [17], further including an organic lithium salt, wherein the organic lithium salt and the inorganic lithium salt satisfy a condition represented by the following formula (7), $$0 \leq X < 1 \quad (7)$$

(wherein X represents a molar ratio of the organic lithium salt based on the inorganic lithium salt).

[19] The non-aqueous secondary battery according to [18], wherein the organic lithium salt is one or more organic lithium salts selected from the group consisting of lithium bis(oxalato)borate and lithium oxalato difluoroborate.

[20] The non-aqueous secondary battery according to any of [1] to [19], wherein the positive electrode contains one or more materials selected from the group consisting of materials capable of doping and dedoping lithium ions as a positive-electrode active material, and the negative electrode contains one or more materials selected from the group consisting of materials capable of doping and dedoping lithium ions and metal lithium as a negative-electrode active material.

[21] The non-aqueous secondary battery according to [20], wherein the positive electrode contains a lithium-containing compound as the positive-electrode active material.

[22] The non-aqueous secondary battery according to [21], wherein the lithium-containing compound includes one or more compounds selected from the group consisting of a metal oxide having lithium and a metal chalcogenide having lithium.

[23] The non-aqueous secondary battery according to any of [20] to [22], wherein the negative electrode contains as the negative-electrode active material one or more materials selected from the group consisting of metal lithium, a carbon material, and a material including an element capable of forming an alloy with lithium.

[24] The non-aqueous secondary battery according to any of [20] to [23], wherein the negative electrode contains as the negative-electrode active material a material that dopes lithium ions at a lower potential than 1.4 V vs. $Li/Li^+$.

[25] The non-aqueous secondary battery according to any of [1] to [24], wherein a positive electrode mixture of the positive electrode includes a positive-electrode active material, a conductive aid, a binder, and at least one compound selected from the group consisting of organic acids and organic acid salts.

[26] The non-aqueous secondary battery according to [25], wherein the compound includes a divalent or greater organic acid or organic acid salt.

[27] The non-aqueous secondary battery according to [25] or [26], wherein a thickness of a positive-electrode active material layer produced from the positive electrode mixture is 50 to 300 μm.

[28] The non-aqueous secondary battery according to any of [1] to [27], wherein the positive electrode and/or the negative electrode are an electrode formed by coating the positive-electrode active material layer and/or the negative-electrode active material layer on an electrode substrate formed by coating a conductive layer that includes a conductive material on an electrode current collector.

[29] The non-aqueous secondary battery according to [28], wherein the conductive layer includes a conductive material and a binder.

[30] A method for producing the non-aqueous secondary battery according to any of [1] to [29], comprising the step of performing initial charging of 0.001 to 0.3 C.

[31] The method for producing the non-aqueous secondary battery according to [30], wherein the initial charging is performed by charging at a constant voltage during a part of the charging process.

Advantageous Effect of the Invention

According to the present invention, a non-aqueous secondary battery can be provided that realizes a high rate performance even when designed with an electrode active material layer having a high volumetric energy density.

BRIEF DESCRIPTION OF DRAWING

FIG. 1 is a cross-sectional view schematically illustrating an example of a non-aqueous secondary battery according to an embodiment of the invention.

DESCRIPTION OF EMBODIMENT

An embodiment for carrying out the present invention (hereinafter referred to as "present embodiment") will now be described in more detail. It is noted that the numerical range indicated using the "to" in the present specification includes the values before and after that symbol.

The non-aqueous secondary battery according to the present embodiment is a non-aqueous secondary battery that includes a non-aqueous electrolyte solution (hereinafter sometimes also referred to simply as "electrolyte solution") that contains a lithium salt and a non-aqueous solvent, a positive electrode, and a negative electrode, wherein a basis weight of a positive-electrode active material layer included in the positive electrode is 8 to 100 $mg/cm^2$, and/or, a basis weight of a negative-electrode active material layer included in the negative electrode is 3 to 46 $mg/cm^2$, and wherein the electrolyte solution has an ion conductivity at 25° C. of 15 mS/cm or more.

Examples of the non-aqueous secondary battery include a lithium-ion secondary battery including a positive electrode containing one or more materials selected from the group consisting of materials capable of doping and dedoping lithium ions as a positive-electrode active material, and a negative electrode containing one or more materials selected from the group consisting of negative electrode materials capable of doping and dedoping lithium ions and metal lithium as a negative-electrode active material.

The non-aqueous secondary battery according to the present embodiment may be, for example, a lithium-ion secondary battery. More specifically, the non-aqueous secondary battery according to the present embodiment may be the lithium-ion secondary battery schematically illustrated in FIG. 1 using a cross-sectional diagram. The lithium-ion secondary battery 100 illustrated in FIG. 1 includes a separator 110, a positive-electrode active material layer 120 and a negative-electrode active material layer 130 that sandwich the separator 110 from either side thereof, a positive electrode current collector 140 (disposed outside the positive-electrode active material layer 120) and a negative electrode current collector 150 (disposed outside the negative-electrode active material layer 130) that further sandwich the laminate formed from these parts (the separator 110, the positive-electrode active material layer 120, and the negative-electrode active material layer 130), and an outer package of battery 160 that accommodates these parts (hereinafter, the positive electrode and the negative electrode are sometimes collectively referred to as "electrode", and the positive-electrode active material layer and the negative-electrode active material layer are sometimes collectively referred to as "electrode active material layer"). The positive electrode is configured from the positive-electrode active material layer 120, which is produced from a positive electrode mixture, and the positive electrode current collector 140. The negative electrode is configured from the negative-electrode active material layer 130, which is produced from a negative electrode mixture, and the negative electrode current collector 150 (hereinafter, the positive electrode mixture and the negative electrode mixture are sometimes collectively referred to as "electrode mixture"). An electrolyte solution is impregnated in the laminate formed by laminating the positive-electrode active material layer 120, the separator 110, and the negative-electrode active material layer 130. Parts that are included in a conventional lithium-ion secondary battery can be used for each of these parts, as long as such parts satisfy the requirements according to the present embodiment. For example, the below-described parts may be used.

<1. Electrolyte Solution>

The electrolyte solution according to the present embodiment is not especially limited, as long as it contains a lithium salt and a non-aqueous solvent, and has an ion conductivity at 25° C. of 15 mS/cm or more. The lithium salt and the non-aqueous solvent may be known materials. Even when designing using an electrode active material layer with a high volumetric energy density, from the perspective of enabling a high rate performance to be exhibited, the ion conductivity at 25° C. is preferably 20 mS/cm or more, and more preferably 25 mS/cm or more. By adjusting the ion conductivity of the electrolyte solution at 25° C. to 15 mS/cm or more, lithium ion conductance in the electrode active material layer is sufficient, which enables charging and discharging at a large current. Further, although the upper limit of the ion conductivity at 25° C. is not especially limited, from the perspective of suppressing unforeseen battery degradation, such as degradation due to elution or peeling of the various battery parts, the ion conductivity is preferably 50 mS/cm or less, more preferably 49 mS/cm or less, and even more preferably 48 mS/cm or less. The ion conductivity of the electrolyte solution can be controlled by, for example, adjusting the viscosity and/or the polarity of the non-aqueous solvent. More specifically, the ion conductivity of the electrolyte solution can be controlled at a high level by mixing a non-aqueous solvent having a low viscosity with a non-aqueous solvent having a high polarity. Further, the ion conductivity of the electrolyte solution can also be controlled at a high level by using a non-aqueous solvent having a low viscosity and a high polarity. The ion conductivity of the electrolyte solution can be measured based on the method described in "(1-1) Non-aqueous electrolyte solution ion conductivity measurement" in the below examples.

Although it is preferred that the non-aqueous electrolyte solution according to the present embodiment does not contain moisture, a trace amount of moisture may be contained as long as such an amount does not hinder the solving of the problem the present invention is directed to solving. This amount of moisture is preferably 0 to 100 ppm based on the total amount of non-aqueous electrolyte solution.

<1-1. Non-Aqueous Solvent>

The non-aqueous solvent is not especially limited, as long as the predetermined level of ion conductivity can be obtained in combination with the other components. Examples thereof may include alcohols, such as methanol and ethanol, as well as aprotic solvents. Of these, an aprotic polar solvent is preferred.

Specific examples of the non-aqueous solvent include cyclic carbonates represented by ethylene carbonate, propylene carbonate, 1,2-butylene carbonate, trans-2,3-butylene carbonate, cis-2,3-butylene carbonate, 1,2-pentylene carbonate, trans-2,3-pentylene carbonate, cis-2,3-pentylene carbonate, trifluoromethyl ethylene carbonate, fluoroethylene carbonate, 1,2-difluoroethylene carbonate; lactones represented by γ-butyrolactone and γ-valerolactone; sulfur compounds represented by sulfolane and dimethyl sulfoxide; cyclic ethers represented by tetrahydrofuran, 1,4-dioxane, and 1,3-dioxane; chain carbonates represented by ethyl methyl carbonate, dimethyl carbonate, diethyl carbonate, methyl propyl carbonate, methyl isopropyl carbonate, dipropyl carbonate, methyl butyl carbonate, dibutyl carbonate, ethyl propyl carbonate, and methyl trifluoroethyl carbonate; mononitriles such as acetonitrile, propionitrile, butyronitrile, valeronitrile, benzonitrile, and acrylonitrile; alkoxy group-substituted nitriles represented by methoxyacetonitrile and 3-methoxypropionitrile; chain carboxylates represented by methyl propionate; chain ethers represented by dimethoxyethane; and ketones such as acetone, methyl ethyl ketone, and methyl isobutyl ketone. In addition, the non-aqueous solvent may also be a halide, represented by fluoride, of these compounds. These examples may be used alone or in combination of two or more thereof.

The non-aqueous solvent preferably has a low viscosity and a high permittivity. Among such solvents, a nitrile-based solvent is preferred due to its excellent balance between viscosity and permittivity. Especially since acetonitrile is a solvent having an outstanding performance, it is more preferred for the nitrile-based solvent to include acetonitrile. Acetonitrile has a low viscosity and a high polarity. By adjusting the acetonitrile content, the ion conductivity of the electrolyte solution at 25° C. can be controlled to 15 mS/cm or more, which is a high range. By using an electrolyte solution that includes such a non-aqueous solvent, based on those characteristics, a non-aqueous secondary battery can be provided that enables a large current discharge and rapid charging. Since compounds containing a nitrile group tend to undergo electrochemical reduction and decomposition, when using a nitrile-based solvent, it is preferred to admix another solvent and/or add an additive to form a protective film on the electrode.

Further, to increase the degree of electrolytic dissociation of the lithium salt that contributes to the charging and discharging of the non-aqueous secondary battery, the non-aqueous solvent preferably includes one or more cyclic aprotic polar solvents, and more preferably includes one or more cyclic carbonates.

In addition, to ensure that the functions, such as solubility, conductivity, and degree of electrolytic dissociation, of the lithium salt are all good, it is preferred to use a mixed solvent of two or more kinds of non-aqueous solvent. Examples of non-aqueous solvents serving as the components of this mixed solvent include the same non-aqueous solvents as those described above. As an example, the mixed solvent may be a mixed solvent of a cyclic carbonate and acetonitrile.

If the non-aqueous solvent according to the present embodiment includes acetonitrile, the acetonitrile content is not especially limited as long as the predetermined level of ion conductivity can be obtained in combination with the other components. However, it is preferred that the acetonitrile content is 5 to 97 vol. % based on the total amount of the non-aqueous solvent, more preferably 10 to 90 vol. %, and even more preferably 25 to 80 vol. %. By adjusting the acetonitrile content to 5 vol. % or more, ion conductivity tends to increase, which enables a high rate characteristic to be exhibited. By adjusting the acetonitrile content to 97 vol. % or less, problems caused by volatilization tend to be suppressed, and a reduction and decomposition reaction at the negative electrode can be mitigated without the use of a special method. If the acetonitrile content in the non-aqueous solvent is within the above-described range, this tends to enable a large improvement in all the long-term cycling performance characteristic and other battery characteristics while maintaining the excellent performance of acetonitrile.

<1-2. Lithium Salt>

The lithium salt is not especially limited, and may be any lithium salt, as long as it is a lithium salt that is commonly used for a non-aqueous secondary battery electrolyte solution and the predetermined level of ion conductivity can be obtained in combination with the other components. It is preferred that the lithium salt is contained in the non-aqueous electrolyte solution according to the present embodiment in a concentration of 0.1 to 3 mol/L, and more preferably in a concentration of 0.5 to 2 mol/L. If the lithium salt concentration is within the above-described range, the permittivity of the electrolyte solution tends to be maintained at a higher level, and the charge/discharge efficiency of the non-aqueous secondary battery also tends to be maintained at a higher level.

Although the lithium salt according to the present embodiment is not especially limited, an inorganic lithium salt is preferred. Here, "inorganic lithium salt" refers to a lithium salt that does not include a carbon atom in the anion, and is soluble in acetonitrile. The term "organic lithium salt" that is mentioned below refers to a lithium salt that includes a carbon atom in the anion, and is soluble in acetonitrile. The inorganic lithium salt is not especially limited, and may be any lithium salt, as long as it is a lithium salt that is used as a normal non-aqueous electrolyte solution. Specific examples of such an inorganic lithium salt include $LiPF_6$, $LiBF_4$, $LiClO_4$, $LiAsF_6$, $Li_2SiF_6$, $LiSbF_6$, $LiAlO_4$, $LiAlCl_4$, $Li_2B_{12}F_bH_{12-b}$ (wherein b represents an integer of 0 to 3), and a lithium salt bound to a polyvalent anion that does not include a carbon atom.

These inorganic lithium salts can be used alone or in combination of two or more thereof. Among these, from the perspective of suppressing an increase in internal resistance, it is preferred to use an inorganic lithium salt having a fluorine atom as the inorganic lithium salt, since a passive film is formed on the surface of a metal foil, which serves as the positive electrode current collector. Further, as the inorganic lithium salt, it is more preferred to use an inorganic lithium salt having a phosphorous atom, because free fluorine atoms tend to be released. $LiPF_6$ is especially preferred. Moreover, as the inorganic lithium salt, it is preferred to use an inorganic lithium salt having a boron atom, because an excess free acid component, which can cause battery degradation, can be captured more easily. From this perspective, $LiBF_4$ is especially preferred.

The content of the inorganic lithium salt in the non-aqueous electrolyte solution according to the present embodiment is preferably 0.1 to 40 mass % based on the total amount of the non-aqueous electrolyte solution, more preferably 1 to 30 mass %, and even more preferably 5 to 25 mass %.

The lithium salt according to the present embodiment may further contain an organic lithium salt in addition to the inorganic lithium salt. Here, if the organic lithium salt is used with an inorganic lithium salt having a high ion conductivity, it is preferred that the condition represented by the following formula (7) is satisfied.

$$0 \leq X < 1 \qquad (7)$$

In formula (7), X represents the molar ratio of the organic lithium salt based on the inorganic lithium salt included in the non-aqueous electrolyte solution. If the molar ratio of the organic lithium salt based on the inorganic lithium salt included in the non-aqueous electrolyte solution is within the above-described range, this tends to enable the high ion conductivity performance of the inorganic lithium salt to preferentially function.

The content of the organic lithium salt in the non-aqueous electrolyte solution according to the present embodiment is preferably 0.1 to 30 mass % based on the total amount of the non-aqueous electrolyte solution, more preferably 0.2 to 20 mass %, and even more preferably 0.5 to 15 mass %. If the content of the organic lithium salt is within this range, this tends to allow a balance between the functions of the electrolyte solution and solubility to be obtained.

Specific examples of the organic lithium salt include organic lithium salts represented by $LiN(SO_2C_mF_{2m+1})_2$ (wherein m represents an integer of 1 to 8), such as $LiN(SO_2CF_3)_2$ and $LiN(SO_2C_2F_5)_2$; organic lithium salts represented by $LiN(SO_2F)_2$; organic lithium salts represented by $LiPF_n(C_pF_{2p+1})_{6-n}$ (wherein n represents an integer of 1 to 5, and p represents an integer of 1 to 8), such as $LiPF_5(CF_3)$; organic lithium salts represented by $LiBF_q(C_sF_{2s+1})_{4-q}$ (wherein q represents an integer of 1 to 3, and s represents an integer of 1 to 8), such as $LiBF_3(CF_3)$; lithium bis(oxalato)borate (LiBOB) represented by $LiB(C_2O_4)_2$; a lithium salt of borate having a halogenated organic acid as a ligand; lithium oxalato difluoroborate (LiODFB) represented by $LiBF_2(C_2O_4)$; lithium bis(malonate)borate (LiBMB) represented by $LiB(C_3O_4H_2)_2$; and lithium tetrafluoro oxalato phosphate represented by $LiPF_4(C_2O_4)$.

Further, the organic lithium salts represented by the following formulae (8a), (8b), and (8c) can also be used.

$$LiC(SO_2R^3)(SO_2R^4)(SO_2R^5) \qquad (8a)$$

$$LiN(SO_2OR^6)(SO_2OR^7) \qquad (8b)$$

$$LiN(SO_2R^8)(SO_2OR^9) \qquad (8c)$$

wherein $R^3$, $R^4$, $R^5$, $R^6$, $R^7$, $R^8$, and $R^9$ may be the same or different, and represent a perfluoroalkyl group having 1 to 8 carbon atoms.

Although these organic lithium salts can be used alone or in combination of two or more thereof, in terms of structural stability, an organic lithium salt that has a boron atom is preferred. Further, organic lithium salts having an organic ligand are preferred from the perspective of suppressing an increase in internal resistance including the positive electrode, since the organic ligands form a protective film called a solid electrolyte interface (SEI) that participates in the electrochemical reactions on the electrode surface. Specifically, preferred examples of such an organic lithium salt include LiBOB, a lithium salt of borate having a halogenated organic acid as a ligand, LiODFB, and LiBMB, and LiBOB and LiODFB are especially preferred.

The electrolyte solution according to the present embodiment may further contain an ionic compound formed from a salt that is formed from an organic cationic species other than a lithium ion and an anionic species. Including an ionic compound in the electrolyte solution has an effect of further suppressing an increase in the internal resistance of the battery.

Examples of the cation of the ionic compound include quaternary ammonium cations, such as tetraethylammonium, tetrabutylammonium, triethyl methyl ammonium, trimethyl ethyl ammonium, dimethyl diethyl ammonium, trimethyl propyl ammonium, trimethyl butyl ammonium, trimethyl pentyl ammonium, trimethyl hexyl ammonium, trimethyl octyl ammonium, and diethyl methyl methoxyethyl ammonium; imidazolium cations, such as 1-ethyl-3-methylimidazolium, 1-butyl-3-methylimidazolium, 1,2-dimethyl-3-propylimidazolium, 1-hexyl-3-methylimidazolium, 1-ethyl-2,3-dimethylimidazolium, and 1-methyl-3-propylimidazolium; pyridinium cations, such as 1-ethyl pyridinium, 1-butyl pyridinium, and 1-hexyl pyridinium; piperidinium cations, such as 1-methyl-1-propylpiperidinium and 1-butyl-1-methylpiperidinium; pyrrolidinium cations, such as 1-ethyl-1-methylpyrrolidinium, 1-methyl-1-propylpyrrolidinium, and 1-butyl-1-methylpyrrolidinium; sulfonium cations, such as diethyl methyl sulfonium and triethylsulfonium; and quaternary phosphonium cations. Among these cations, from the perspective of electrochemical stability, cations having a nitrogen atom are preferred, and pyridinium cations are more preferred.

The anion of the ionic compound may be an anion that is normally used as a counter ion of the above-described cations. Examples include $BF_4^-$, $PF_6^-$, $N(SO_2CF_3)_2^-$, $N(SO_2C_2F_5)_2^-$, and $SO_3CF_3^-$. Among these anions, $PF_6^-$ is preferred as it has excellent ionic dissociative properties and is excellent in suppressing an increase in internal resistance.

<1-3. Additive>

The electrolyte solution according to the present embodiment may also include an additive that protects the electrodes. The additive is not especially limited, as long as it does not hinder the solving of the problem the present invention is directed to solving. The additive may be a substance that serves as the solvent for dissolving the lithium salt, namely, may essentially be the above-described non-aqueous solvent. Further, although it is preferred that this additive is a substance that contributes to improving the performance of the non-aqueous electrolyte solution and the non-aqueous secondary battery according to the present embodiment, the additive may be a substance that does not directly participate in the electrochemical reactions. The additive can be used alone or in combination of two or more thereof.

Specific examples of the additive include fluoro ethylene carbonates represented by 4-fluoro-1,3-dioxolan-2-one, 4,4-difluoro-1,3-dioxolan-2-one, cis-4,5-difluoro-1,3-dioxolan-2-one, trans-4,5-difluoro-1,3-dioxolan-2-one, 4,4,5-trifluoro-1,3-dioxolan-2-one, 4,4,5,5-tetrafluoro-1,3-dioxolan-2-one, and 4,4,5-trifluoro-5-methyl-1,3-dioxolan-2-one; unsaturated bond-containing cyclic carbonates represented by vinylene carbonate, 4,5-dimethyl vinylene carbonate, and vinyl ethylene carbonate; lactones represented by γ-butyrolactone, γ-valerolactone, γ-caprolactone, δ-valerolactone, δ-caprolactone, and ε-caprolactone; cyclic ethers represented by 1,2-dioxane; carbonates represented by methyl formate, methyl acetate, methyl propionate, methyl butyrate, ethyl formate, ethyl acetate, ethyl propionate, ethyl butyrate, n-propyl formate, n-propyl acetate, n-propyl propionate, n-propyl butyrate, isopropyl formate, isopropyl acetate, isopropyl propionate, isopropyl butyrate, n-butyl formate, n-butyl acetate, n-butyl propionate, n-butyl butyrate, isobutyl formate, isobutyl acetate, isobutyl propionate, isobutyl butyrate, sec-butyl formate, sec-butyl acetate, sec-butyl propionate, sec-butyl butyrate, tert-butyl formate, tert-butyl acetate, tert-butyl propionate, tert-butyl butyrate, methyl pivalate, n-butyl pivalate, n-hexyl pivalate, n-octyl pivalate, dimethyl oxalate, ethyl methyl oxalate, diethyl oxalate, diphenyl oxalate, a malonic acid ester, a fumaric acid ester, and a maleic acid ester; amides represented by N-methylformamide, N,N-dimethylformamide, and N,N-dimethylacetamide; cyclic sulfur compounds represented by ethylene sulfite, propylene sulfite, butylene sulfite, pentene sulfite, sulfolane, 3-methyl sulfolane, 3-sulfolene, 1,3-propane sultone, 1,4-butane sultone, 1,3-propanediol sulfate, tetramethylene sulfoxide, and thiophene-1-oxide; aromatic compounds represented by monofluorobenzene, biphenyl, and a fluorinated biphenyl; nitro compounds represented by nitromethane; Schiff bases; Schiff base complexes; and oxalato complexes. These can be used alone or in combination of two or more thereof.

Although the content of the additive in the electrolyte solution according to the present embodiment is not especially limited, the content is preferably 0.1 to 30 mass % based on the total amount of electrolyte solution, more preferably 0.2 to 25 mass %, and even more preferably 0.5 to 20 mass %. In the present embodiment, although the additive contributes to the exhibition of a high cycling performance, it has not been confirmed whether the additive effects the high rate performance under a low-temperature environment. Although the greater the additive content is the more degradation of the electrolyte solution is suppressed, the lower the additive content is the better the high-rate characteristic under a low-temperature environment is. Therefore, adjusting the content of the additive to within the above-described range tends to allow the excellent performance to be exhibited more sufficiently based on the high ion conductivity of the non-aqueous electrolyte solution without harming the basic functions as a non-aqueous secondary battery. By producing the electrolyte solution based on such a composition, this tends to enable the cycling performance of the electrolyte solution, the high rate performance under a low-temperature environment as well as all the other battery characteristics to be greatly improved.

In the present embodiment, from the perspective of improving the durability of the SEI, it is especially preferred to use two or more kinds of non-nitrile additive together. It is also preferred that the non-nitrile additives include one or more compounds selected from the group consisting of the compounds represented by the following formula (1) (hereinafter referred to as "compound (1)").

$$R^1\text{-}A\text{-}R^2 \tag{1}$$

wherein $R^1$ and $R^2$ each independently represent an alkyl group optionally substituted with an aryl group or a halogen atom, or an aryl group optionally substituted with an alkyl group or a halogen atom, or $R^1$ and $R^2$ are bonded to each other to form a cyclic structure that may have an unsaturated bond with A, wherein A represents a divalent group having a structure represented by any one of the following formulae (2) to (6).

[Formula 2]

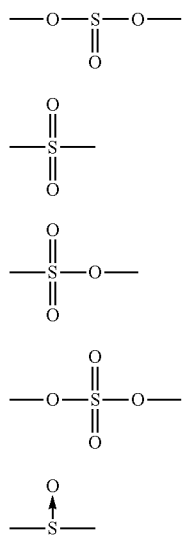

It is preferred that the alkyl group optionally substituted with an aryl group or a halogen atom represented by $R^1$ and $R^2$ is an alkyl group having 1 to 4 carbon atoms which may be substituted with an aryl group or a halogen atom, and more preferably is an alkyl group having 1 to 4 carbon atoms which may be substituted with a phenyl group or a halogen atom. Specific examples of the alkyl group include a methyl group, an ethyl group, a propyl group, an isopropyl group, and a butyl group. In addition, examples of the aryl group as a substituent include a phenyl group, a naphthyl group, and an anthranyl group. Of these, a phenyl group is preferred. Preferred examples of the halogen atom as a substituent of the alkyl group include a fluorine atom, a chlorine atom, and a bromine atom. There may be a plurality of these substituents on the alkyl group, and an aryl group and a halogen atom may both be substituted.

It is preferred that the aryl group optionally substituted with an alkyl group or a halogen atom represented by $R^1$ and $R^2$ is a phenyl group, a naphthyl group, and an anthranyl group optionally substituted with an alkyl group or a halogen atom, more preferably is a phenyl group optionally substituted with an alkyl group or a halogen atom, and even more preferably is a phenyl group optionally substituted with a halogen atom. Examples of the aryl group include a phenyl group, a naphthyl group, and an anthranyl group. Of these, a phenyl group is preferred. Further, the alkyl group as a substituent of the aryl group is preferably an alkyl group having 1 to 4 carbon atoms. Examples may include a methyl group, an ethyl group, a propyl group, an isopropyl group, and a butyl group. Preferred examples of the halogen atom as a substituent of the aryl group include a fluorine atom, a chlorine atom, and a bromine atom. There may be a plurality of these substituents on the aryl group, and an alkyl group and a halogen atom may both be substituted.

The cyclic structure formed by $R^1$ and $R^2$ bonding to each other along with A is preferably a ring having four or more members. This cyclic structure may have one or more of either a double bond or a triple bond. The $R^1$ and $R^2$ bonded to each other are both preferably a divalent hydrocarbon group which preferably has 1 to 6 carbons atoms. Specific examples include —CH$_2$—, —CH$_2$CH$_2$—, —CH$_2$CH$_2$CH$_2$—, —CH$_2$CH$_2$CH$_2$CH$_2$—, —CH$_2$CH$_2$CH$_2$CH$_2$CH$_2$—, —CH═CH—, —CH═CHCH$_2$—, —CH═CHCH$_2$CH$_2$—, —CH$_2$CH═CHCH$_2$—, and —CH$_2$CH$_2$C≡CCH$_2$CH$_2$—. Further, one or more of the hydrogen atoms of these groups may be substituted with one or more alkyl groups (e.g., a methyl group and an ethyl group), halogen atoms (e.g., a fluorine atom, a chlorine atom, and a bromine atom), or aryl groups (e.g., a phenyl group). $R^1$ and $R^2$ may be the same or different to each other.

Specific examples of the compound (1) in which A is a divalent group having a structure represented by the above formula (2) include chain sulfites, such as dimethyl sulfite, diethyl sulfite, ethyl methyl sulfite, methyl propyl sulfite, ethyl propyl sulfite, diphenyl sulfite, methyl phenyl sulfite, ethyl sulfite, dibenzyl sulfite, benzyl methyl sulfite, and benzyl ethyl sulfite; cyclic sulfites, such as ethylene sulfite, propylene sulfite, butylene sulfite, pentene sulfite, vinylene sulfite, phenyl ethylene sulfite, 1-methyl-2-phenyl ethylene sulfite, and 1-ethyl-2-phenyl ethylene sulfite; and a halide of these chain sulfites and cyclic sulfites.

Specific examples of the compound (1) in which A is a divalent group having a structure represented by the above formula (3) include chain sulfones, such as dimethyl sulfone, diethyl sulfone, ethyl methyl sulfone, methyl propyl sulfone, ethyl propyl sulfone, diphenyl sulfone, methyl phenyl sulfone, ethyl phenyl sulfone, dibenzyl sulfone, benzyl methyl sulfone, and benzyl ethyl sulfone; cyclic sulfones, such as sulfolane, 2-methyl sulfolane, 3-methyl sulfolane, 2-ethyl sulfolane, 3-ethyl sulfolane, 2,4-dimethylsulfolane, 3-sulfolene, 3-methyl sulfolene, 2-phenyl sulfolane, and 3-phenyl sulfolane; and a halide of these chain sulfones and cyclic sulfones.

Specific examples of the compound (1) in which A is a divalent group having a structure represented by the above formula (4) include chain sulfonates, such as methyl methanesulfonate, ethyl methanesulfonate, propyl methanesulfonate, methyl ethanesulfonate, ethyl ethanesulfonate, propyl ethanesulfonate, methyl benzenesulfonate, ethyl benzenesulfonate, propyl benzenesulfonate, phenyl methanesulfonate, phenyl ethanesulfonate, phenyl propanesulfonate, benzyl methanesulfonate, benzyl ethanesulfonate, and benzyl propanesulfonate; cyclic sulfonates, such as 1,3-propanesultone, 1,4-butanesultone, 3-phenyl-1,3-propanesultone, and 4-phenyl-1,4-butanesultone; and a halide of these chain sulfonates and cyclic sulfonates.

Specific examples of the compound (1) in which A is a divalent group having a structure represented by the above formula (5) include chain sulfates, such as dimethyl sulfate, diethyl sulfate, ethyl methyl sulfate, methyl propyl sulfate, ethyl propyl sulfate, methyl phenyl sulfate, ethyl phenyl sulfate, phenyl propyl sulfate, benzyl methyl sulfate, and benzyl ethyl sulfate; cyclic sulfates, such as ethylene glycol sulfate, 1,2-propanediol sulfate, 1,3-propanediol sulfate, 1,2-butanediol sulfate, 1,3-butanediol sulfate, 2,3-butanediol sulfate, phenyl ethylene glycol sulfate, methyl phenyl ethylene glycol sulfate, and ethyl phenyl ethylene glycol sulfate; and a halide of these chain sulfates and cyclic sulfates.

Specific examples of the compound (1) in which A is a divalent group having a structure represented by the above formula (6) include chain sulfoxides, such as dimethyl sulfoxide, diethyl sulfoxide, ethyl methyl sulfoxide, methyl propyl sulfoxide, ethyl propyl sulfoxide, diphenyl sulfoxide, methyl phenyl sulfoxide, ethyl phenyl sulfoxide, dibenzyl sulfoxide, benzyl methyl sulfoxide, and benzyl ethyl sulfoxide; cyclic sulfoxides, such as tetramethylene sulfoxide and thiophene-1-oxide; and a halide of these chain sulfoxides and cyclic sulfoxides.

The compound (1) can be used alone or in combination of two or more thereof. When using a combination of two or more kinds of compound (1), the respective structure of A in the compounds (1) may be the same or different.

Although the content of compound (1) in the non-aqueous electrolyte solution is not especially limited, the content is preferably 0.05 to 30 vol. % based on the total amount of the components included in the non-aqueous electrolyte solution excluding the lithium salt, more preferably 0.1 to 20 vol. %, and even more preferably 0.5 to 10 vol. %. Although there are compounds among compound (1) that are a solid at room temperature (25° C.), in such a case those compounds are used in the range under a saturation in acetonitrile of preferably 60 mass % or less of the saturation, and more preferably 30 mass % or less of the saturation. If the content of compound (1) is within the above-described range, this tends to enable the increase in internal resistance including the positive electrode to be suppressed due to the formation of a SEI on the electrode surface as a result of the compound (1) participating in the electrochemical reactions.

From the perspective of ring-opening polymerization, it is preferred that the compound (1) forms a cyclic structure. Of these, a higher performance can be sustainably exhibited even under a harsh usage environment such as that in high-temperature charging/discharging, and charging and storage, for example, by including one or more compounds selected from the group consisting of ethylene sulfite, propylene sulfite, butylene sulfite, pentene sulfite, sulfolane, 3-methyl sulfolane, 3-sulfolene, 1,3-propane sultone, 1,4-butane sultone, 1,3-propanediol sulfate, and tetramethylene sulfoxide.

From the perspective of improving the durability of the SEI, it is preferred that the electrolyte solution according to the present embodiment is used by combining one or more compounds selected from the group consisting of carbonates, namely, compounds having a $CO_3$ in the molecule, with the compound (1). Further, it is preferred that the carbonate is an organic carbonate, more preferably a cyclic carbonate, and a compound having a carbon-carbon double bond is even more preferable. Among these, if vinylene carbonate is the main component, namely, is the carbonate with the largest content, the durability of the SEI is dramatically improved due to a synergistic effect with the compound (1). The reason for this is thought to be due to the flexibility and poor solubility of the SEI improving as a result of such a carbonate undergoing a decomposition reaction by copolymerization more easily, namely, more easily forming a copolymer with other additives, and the compound (1) playing the role of a comonomer. However, the reason for the above improvement is not limited to this.

<1-4. Dinitrile Compound>

The non-aqueous electrolyte solution according to the present embodiment may further contain a dinitrile compound, namely, a compound having two nitrile groups in the molecule. Dinitrile compounds have an effect of reducing corrosion of the metal parts, such as the battery can and the electrodes. The reason for this is thought to be because of the formation of a protective film suppressing corrosion on the surface of metal parts with decreased corrosion due to the use of the dinitrile compound. However, the reason for this effect is not limited to this.

Although the dinitrile compound is not especially limited as long as it does not hinder the solving of the problem the present invention is directed to solving, a dinitrile compound having a methylene chain is preferred. It is more preferred that the number of methylene chains is 1 to 12. These methylene chains may be straight-chain or branched. Examples of the dinitrile compound include straight-chain dinitrile compounds, such as succinonitrile, glutaronitrile, adiponitrile, 1,5-dicyanopentane, 1,6-dicyanohexane, 1,7-dicyanoheptane, 1,8-dicyanooctane, 1,9-dicyanononane, 1,10-dicyanodecane, 1,11-dicyanoundecane, and 1,12-dicyanododecane; branched dinitrile compounds, such as tetramethylsuccinonitrile, 2-methylglutaronitrile, 2,4-dimethylglutaronitrile, 2,2,4,4-tetramethylglutaronitrile, 1,4-dicyanopentane, 2,5-dimethyl-2,5-hexanedicarbonitrile, 2,6-dicyanoheptane, 2,7-dicyanooctane, 2,8-dicyanononane, and 1,6-dicyanodecane; and aromatic dinitrile compounds, such as 1,2-dicyanobenzene, 1,3-dicyanobenzene, and 1,4-dicyanobenzene. These can be used alone or in combination of two or more thereof.

Although the content of the dinitrile compound in the non-aqueous electrolyte solution according to the present embodiment is not especially limited, it is preferred that the content is 0.01 to 1 mol/L based on the total amount of the components included in the electrolyte solution excluding the lithium salt, more preferably 0.02 to 0.5 mol/L, and even more preferably 0.05 to 0.3 mol/L. If the dinitrile compound content is within this range, this tends to allow the cycling performance to be greatly improved without harming the basic functions as a non-aqueous secondary battery.

If the number of methylene chains is an even number, the dinitrile compound tends to have a low dipole moment. However, surprisingly, it was experimentally found that the additive effect is higher than in the case of an odd number of methylene chains. Therefore, it is preferred that the dinitrile compound includes one or more compounds selected from the group consisting of compounds represented by the following formula (9).

$$NC-(CR^{10}R^{11})_{2a}-CN \quad (9)$$

In formula (9), $R^{10}$ and $R^{11}$ each independently represent a hydrogen atom or an alkyl group, and a represents an integer of 1 to 6. The alkyl group preferably has 1 to 10 carbon atoms.

<2. Positive Electrode and Positive Electrode Current Collector>

The positive electrode is not especially limited, and may be a known positive electrode, as long as it acts as the positive electrode of a non-aqueous secondary battery.

It is preferred that the positive electrode contain one or more materials selected from the group consisting of materials capable of doping and dedoping lithium ions as a positive-electrode active material, as this tends to allow a high voltage and a high energy density to be obtained. Examples of such a material include lithium-containing compounds represented by the following formulae (10a) and (10b), and a metal oxide and a metal chalcogenide having a tunnel structure and a layer structure. The term chalcogenide refers to a sulfide, a selenide, and a telluride.

$$Li_xMO_2 \quad (10a)$$

$$Li_yM_2O_4 \quad (10b)$$

wherein M represents one or more metal elements including at least one kind of transition metal element, x represents a number of 0 to 1.1, and y represents a number of 0 to 2.

Examples of lithium-containing compounds represented by the above formulae (10a) and (10b) include lithium cobalt oxides represented by $LiCoO_2$; lithium manganese oxides represented by $LiMnO_2$, $LiMn_2O_4$ and $Li_2Mn_2O_4$; lithium nickel oxides represented by $LiNiO_2$; and lithium-containing composite metal oxides represented by $Li_zMO_2$ (wherein M includes at least one kind of transition metal element selected from Ni, Mn, and Co, and represents two or more kinds of metal elements selected from the group consisting of Ni, Mn, Co, Al, and Mg, and z represents a number of more than 0.9 to less than 1.2).

Examples of lithium-containing compounds other than those of formulae (10a) and (10b) are not especially limited as long as they contain lithium, and may include, for example, composite oxides including lithium and a transition metal element, metal phosphate compounds including lithium and a transition metal element, and metal silicate compounds including lithium and a transition metal element (e.g., $Li_tM_uSiO_4$, wherein M has the same meaning as described for the above formula (10a), t represents a number of 0 to 1, and u represents a number of 0 to 2). From the perspective of obtaining a higher voltage, a composite oxide including lithium and at least one transition metal element selected from the group consisting of cobalt (Co), nickel (Ni), manganese (Mn), iron (Fe), copper (Cu), zinc (Zn), chromium (Cr), vanadium (V), and titanium (Ti), and a metal phosphate are preferred.

More specifically, it is preferred that the lithium-containing compound is a metal oxide having lithium or a metal chalcogenide having lithium, and a metal phosphate having a lithium. Examples may include the compounds represented by the following formulae (11a) and (11b). Among these, a metal oxide having lithium and a metal chalcogenide having lithium are more preferred.

$$Li_vM^ID_2 \quad (11a)$$

$$Li_wM^{II}PO_4 \quad (11b)$$

wherein D represents an oxygen or a chalcogen element, and $M^I$ and $M^{II}$ each represent one or more transition metal elements. Although the values of v and w depend on the charge-discharge state of the battery, usually v represents a number of 0.05 to 1.10, and w represents a number of 0.05 to 1.10.

The compounds represented by the above formula (11a) usually have a layer structure, and the compounds represented by the above formula (11b) usually have an olivine structure. From the perspective of stabilizing the structure, in these compounds, a portion of the transition metal elements may be substituted with Al, Mg, or some other transition metal element, or included in a crystal grain boundary. Further, a portion of the oxygen atoms may be substituted with a fluorine atom and the like. In addition, another positive-electrode active material may be coated on at least a part of the positive-electrode active material surface.

In addition, examples of the metal oxide or the metal chalcogenide having a tunnel structure and a layer structure may include oxides, sulfides, and selenides of a metal other than lithium, represented by $MnO_2$, $FeO_2$, $FeS_2$, $V_2O_5$, $V_6O_{13}$, $TiO_2$, $TiS_2$, $MoS_2$, and $NbSe_2$.

Examples of other positive-electrode active materials include sulfur, as well as conductive polymers represented by polyaniline, polythiophene, polyacetylene, and polypyrrole.

The above-described positive-electrode active material can be used alone or in combination of two or more thereof.

The number average particle size (primary particle size) of the positive-electrode active material is preferably 0.05 to 100 μm, and more preferably 1 to 10 μm. The number average particle size of the positive-electrode active material can be measured using a wet-type particle size analyzer (e.g., a laser diffraction/scattering particle size distribution analyzer, or a dynamic light scattering particle size distribution analyzer). Alternatively, the number average particle size can also be obtained by randomly extracting 100 particles that have been observed under a transmission electron microscope, then analyzing the particles using image analysis software (e.g., image analysis software from Asahi Kasei Engineering Corporation; trade name: "A-zou kun"), and then calculating an arithmetic average of the obtained values. In this case, if the number average particle size of a single sample varies depending on measurement method, a calibration curve produced by targeting to a standard sample may be used.

The positive electrode mixture of the non-aqueous secondary battery according to the present embodiment may be a positive electrode mixture that includes a positive-electrode active material, a conductive aid, a binder, and at least one compound selected from the group consisting of organic acids and organic acid salts (hereinafter, abbreviated as "organic acid compound"). A positive electrode mixture that includes an organic acid compound is preferred because such a positive electrode mixture tends to have a very low risk of causing brittleness and a deterioration in the binding properties with the electrode current collectors, and tends to function very stably, even when a non-aqueous electrolyte solution with a high ion conductivity is used. Further, even when the positive-electrode active material layer is formed as thickly as possible to achieve an increased capacity, since there tends to be little risk of causing positive electrode degradation as a result of cracking or disintegration of the positive-electrode active material layer, and the functions of the non-aqueous electrolyte solution having a high ion conductivity tend to be sufficiently exhibited, a non-aqueous secondary battery can be provided in which an increase in internal resistance due to positive electrode degradation is greatly suppressed.

The kind of organic acid and organic acid salt, which have a role of increasing the binding force among the positive-electrode active materials and between the positive-electrode active material layer and the electrode current collectors, is not especially limited as long as the organic acid and organic acid salt are soluble in an organic solvent. From the perspectives that the fluidity of the positive electrode mixture is high and an increase in the viscosity that occurs over time is suppressed, it is preferred that the at least one compound selected from the group consisting of organic acids and organic acid salts includes a divalent or greater organic acid or organic acid salt. Specific examples of the organic acid compound include monocarboxylic acids, such as formic acid, acetic acid, propionic acid, butyric acid, and acrylic acid; saturated aliphatic dicarboxylic acids, such as oxalic acid, malonic acid, succinic acid, glutaric acid, adipic acid, pimelic acid, suberic acid, azelaic acid, and sebacic acid; unsaturated aliphatic dicarboxylic acids, such as maleic acid and fumaric acid; aromatic dicarboxylic acids, such as phthalic acid; tricarboxylic acids, such as citric acid; and lithium salts, sodium salts, and ammonium salts of the above-described carboxylic acids. Among these, oxalic acid and malonic acid are preferred since the dried positive-electrode active material layer is less susceptible to the occurrence of surface unevenness due to the suppression of an increase in the positive electrode mixture slurry viscosity.

The above-described compounds can be used alone or in combination of two or more thereof.

The amount of the organic acid compound added is preferably 0.01 to 3 parts by mass based on 100 parts by mass of the positive-electrode active material, more preferably 0.05 to 2.5 parts by mass, and even more preferably 0.1 to 2 parts by mass. From the perspective of binding force, it is preferred that the amount of the organic acid compound added is 0.01 parts by mass or more. From the perspectives of slurry viscosity, dispersibility, and uniformity of the dried positive-electrode active material layer, it is preferred that the amount of the organic acid compound added is 3 parts by mass or less.

The positive electrode, which includes the positive-electrode active material, and optionally a conductive aid, binder, and organic acid compound, can be obtained as follows, for example. Namely, first, the conductive aid and the organic acid compound are added to the above-described positive-electrode active material, and the resultant mixture is uniformly mixed in a dry state. The binder and the like are then added, and the mixture is dispersed in a solvent to prepare a positive electrode mixture-containing slurry. Here, the solid content concentration in the positive electrode mixture-containing slurry is preferably 30 to 80 mass %, and more preferably 40 to 70 mass %. Next, this positive electrode mixture-containing slurry is coated on a positive electrode current collector, and then dried to form a coated layer. The coated layer obtained after the drying is compressed with a roll press or the like to form a positive-electrode active material layer. It is preferred that the thickness of the compressed positive-electrode active material layer is 10 to 300 µm, more preferably 20 to 280 µm, and even more preferably 30 to 250 µm. By including the organic acid compound, the functions of the non-aqueous electrolyte solution having a high ion conductivity can be sufficiently exhibited without causing positive electrode degradation as a result of cracking or disintegration of the positive-electrode active material layer even when a thick as possible positive-electrode active material layer is formed to achieve an increased capacity. Consequently, in such a case, it is preferred that the thickness of the compressed positive-electrode active material layer is 50 to 300 µm, more preferably 60 to 280 µm, and even more preferably 80 to 250 µm.

The non-aqueous secondary battery according to the present embodiment is adjusted so that the basis weight of the positive-electrode active material layer included in the positive electrode is 8 to 100 mg/cm². If the greatest emphasis is placed on a high rate characteristic, this basis weight is preferably 9 to 50 mg/cm², and more preferably 10 to 26 mg/cm². On the other hand, from the perspective of improving volumetric energy density while maintaining a balance with the rate performance of the non-aqueous secondary battery, the basis weight is preferably 24 to 100 mg/cm², more preferably 25 to 80 mg/cm², and even more preferably 26 to 60 mg/cm². Since the non-aqueous secondary battery according to the present embodiment uses an electrolyte solution having an ion conductivity of 15 mS/cm or more, a non-aqueous secondary battery that realizes a high rate performance can be provided even when designing the electrode active material layer with a high volumetric energy density.

Here, when forming the electrode active material layer on one face of the current collector, the basis weight represents the mass of the electrode active material layer included per 1 cm² area of the electrode. When forming the electrode active material layer on both faces of the current collector, the basis weight represents the mass of the electrode active material layer included per 1 cm² area of the electrode on each face. A large amount of the electrode active material coated on the electrode current collector increases the capacity of the battery, since the electrode active material per unit area of the battery is relatively more than other battery materials that are not related to battery capacity, such as the current collector foil and the separator.

The basis weight when forming the electrode active material layer on one face of the current collector can be calculated by the following formula (12).

$$\text{Basis weight [mg/cm}^2\text{]}=(\text{Electrode mass [mg]}-\text{electrode current collector mass [mg]})/\text{electrode area [cm}^2\text{]} \quad (12)$$

The basis weight of the electrode active material layer can be adjusted by controlling the coating thickness of the active material layer based on a doctor blade method when coating on the current collector the electrode mixture-containing slurry, which is obtained by dispersing the electrode mixture, in which the electrode active material, the binder, and the conductive aid are mixed, in a solvent. Further, the basis weight of the electrode active material layer can also be adjusted by controlling the concentration of the electrode mixture-containing slurry.

Although the porosity of the positive-electrode active material layer according to the present embodiment is not especially limited, in the non-aqueous secondary battery, from the perspective of improving volumetric energy density while maintaining a balance with rate performance, the porosity is preferably 20 to 45%, more preferably 22 to 42%, and even more preferably 25 to 35%. If the porosity is 20% or more, diffusion of the lithium ions in the positive-electrode active material layer is less susceptible to being hindered, and the rate characteristic is secured. Further, if the porosity of the positive-electrode active material layer is 45% or less, this tends to allow suppression of peeling degradation of the positive-electrode active material layer and drying out of the non-aqueous electrolyte solution, and enable durability performance to be secured while realizing higher rate.

The porosity of the electrode active material layer can be calculated by the following formula (13).

$$\text{Porosity [\%]}=(1-\text{Actual electrode density [g/cm}^3\text{]}/\text{theoretical electrode density [g/cm}^3\text{]})\times 100 \quad (13)$$

The actual electrode density can be determined by dividing the mass of the electrode active material layer by the volume of the electrode active material layer. Here, the mass of the electrode active material layer is a value calculated by subtracting the mass of the electrode current collector from the mass of an electrode punched out into a predetermined surface area with a punching machine, such as a punch. The volume of the electrode active material layer is a value calculated by multiplying the surface area by the thickness of the electrode active material layer, which is obtained by subtracting the thickness of the electrode current collector from the thickness of the electrode as measured with a micrometer.

The theoretical electrode density can be determined by multiplying the composition ratio by the density of each of the materials forming the electrode, such as the electrode active material, the conductive aid, the binder and the like, and adding the obtained values. It is noted that the particle density is a value obtained by dividing the mass of the particles by the volume of particles including a closed cavity inside the particles. Indents or crevices on the particle surface and open cavities are not included in the particle volume.

The porosity of the electrode active material layer can be adjusted by, for example, controlling the bulk density of the electrode active material and compressing the electrode. Compression of the electrode is carried out with compressing means such as a roll press. Although the pressing pressure is not especially limited, it is preferably 2 to 8 MPa, and more preferably 4 to 7 MPa. From the perspective of aiming for an increased battery capacity, it is preferred to press the electrode at a high pressure, since an electrode active material layer having a low porosity is obtained. Further, from the perspective of suppressing electrode degradation when using a non-aqueous electrolyte solution having a high ion conductivity, it is also preferred to press the electrode at a high pressure, since the binding force of the electrode active material layer is increased.

Examples of the conductive aid include graphite, carbon black represented by acetylene black and Ketjen Black, and carbon fiber. The number average particle size (primary particle size) of the conductive aid is preferably 10 nm to 10 µm, and more preferably 20 nm to 1 µm. The number average particle size of the conductive aid is measured in the same manner as the number average particle size of the positive-electrode active material. Examples of the binder include polyvinylidene fluoride (PVDF), polytetrafluoroethylene (PTFE), polyacrylic acid, styrene-butadiene rubber, and fluorine rubber. Further, the solvent is not especially limited, and a conventionally known solvent may be used. Examples thereof include N-methyl-2-pyrrolidone, dimethylformamide, dimethylacetamide, and water.

The positive electrode current collector is formed from, for example, a metal foil, such as aluminum foil, nickel foil, or stainless steel foil. Further, the positive electrode current collector may be subjected to carbon coating, and may also be formed in a mesh shape. The thickness of the positive electrode current collector is preferably 5 to 40 µm, more preferably 7 to 35 µm, and even more preferably 9 to 30 µm.

<3. Negative Electrode and Negative Electrode Current Collector>

The negative electrode is not especially limited, and may be a known negative electrode, as long as it acts as the negative electrode of a non-aqueous secondary battery.

The negative electrode preferably contains one or more materials selected from the group consisting of materials capable of doping and dedoping lithium ions and metal lithium, as a negative-electrode active material. Examples of such materials include, in addition to metal lithium, carbon materials represented by amorphous carbon (hard carbon), artificial graphite, natural graphite, pyrolytic carbon, coke, glassy carbon, sintered compacts of organic polymer compounds, mesocarbon microbeads, carbon fiber, activated carbon, graphite, carbon colloid, and carbon black. Among these, examples of the coke include pitch coke, needle coke, and petroleum coke. The sintered compact of an organic polymer compound is a material obtained by sintering and carbonizing polymer materials such as a phenol resin and a furan resin at a suitable temperature. The carbon material may contain, in addition to carbon, a heterogeneous element or a heterogeneous compound, such as O, B, P, N, S, Si, SiC, SiO, $SiO_2$, $B_4C$. The content of the heterogeneous element or heterogeneous compound is preferably 0 to 10 mass % based on the carbon material.

Further examples of materials capable of doping and dedoping lithium ions include materials containing an element capable of forming an alloy with lithium. This material may be a single substance of a metal or a semimetal, or an alloy thereof, or a compound thereof. Alternatively, this material may have one or two or more phases of these as at least a part of the material.

In the present specification, the term "alloy" includes, in addition to compounds formed from two or more metal elements, compounds having one or more metal elements and one or more semimetal elements. If an alloy has a metallic nature as a whole, the alloy may contain a nonmetal element. The structure of the alloy may be a solid solution, an eutectic (an eutectic mixture), an intermetallic compound, or two or more thereof coexisting.

Examples of metal elements and semimetal elements capable of forming an alloy with lithium include titanium (Ti), tin (Sn), lead (Pb), aluminum (Al), indium (In), silicon (Si), zinc (Zn), antimony (Sb), bismuth (Bi), gallium (Ga), germanium (Ge), arsenic (As), silver (Ag), hafnium (Hf), zirconium (Zr), and yttrium (Y).

Among these, metal elements and semimetal elements of Group 4 or 14 in the long-form periodic table are preferable, and especially preferable are titanium, silicon, and tin, which have a large ability of doping and dedoping lithium, and can obtain a high energy density.

Examples of tin alloys include alloys having, as a second constituent element other than tin, one or more elements selected from the group consisting of silicon, magnesium (Mg), nickel, copper, iron, cobalt, manganese, zinc, indium, silver, titanium (Ti), germanium, bismuth, antimony, and chromium (Cr).

Examples of silicon alloys include alloys having, as a second constituent element other than silicon, one or more elements selected from the group consisting of tin, magnesium, nickel, copper, iron, cobalt, manganese, zinc, indium, silver, titanium, germanium, bismuth, antimony, and chromium.

Examples of compounds of titanium, compounds of tin, and compounds of silicon include compounds having oxygen (O) or carbon (C), and these may have, in addition to titanium, tin, or silicon, an above-mentioned second constituent element.

The negative electrode may also contain a metal compound that can dope lithium ions in the range of 0.4 to 3 V vs. $Li/Li^+$ as a negative-electrode active material. Examples of the metal compound include metal oxides, metal sulfides, and metal nitrides.

Examples of metal oxides include titanium oxide, lithium titanium oxide (a lithium titanium-containing composite oxide), tungsten oxide (e.g., $WO_3$), amorphous tin oxide (e.g., $SnB_{0.4}P_{0.6}O_{3.1}$), silicon tin oxide (e.g., $SnSiO_3$), and silicon oxide (SiO). Among these, titanium oxide and lithium titanium oxide are preferred.

Examples of lithium titanium oxides include lithium titanate having a spinel structure {e.g., $Li_{4+c}Ti_5O_{12}$ (wherein c can vary in the charging/discharging reaction in the range of $-1 \leq c \leq 3$)} and lithium titanate having a ramsdellite structure {e.g., $Li_{2+d}Ti_3O_7$ (wherein d can vary in the charging/discharging reaction in the range of $-1 \leq d \leq 3$)}.

As the titanium oxide, either a titanium oxide that contains Li, or a titanium oxide that does not contain Li, prior to charging/discharging can be used. Examples of titanium oxides that do not contain Li prior to charging/discharging, namely, during synthesis, include titanium oxide (e.g., $TiO_2$, $H_2Ti_{12}O_{25}$) and titanium composite oxides containing Ti and at least one element selected from the group consisting of P, V, Sn, Cu, Ni, and Fe. As the $TiO_2$, an anatase type oxide that has a low degree of crystallinity at a heat treatment temperature of 300 to 500° C. is preferred. Examples of the titanium composite oxide include $TiO_2$—$P_2O_5$, $TiO_2$—$V_2O_5$, $TiO_2$—$P_2O_5$—$SnO_2$, $TiO_2$—$P_2O_5$-MeO (wherein Me represents at least one element selected from the group consisting of Cu, Ni, and Fe). It is preferred that the titanium composite oxide has a low degree of crystallinity, and has a microstructure in which a crystal phase and an amorphous phase coexist or only an amorphous phase exists. Having such a microstructure enables the cycling performance to be substantially improved.

Examples of titanium oxides that contain Li prior to charging/discharging, namely, during production, include $Li_eTiO_2$ (wherein $0 \le e \le 1.1$).

Examples of metal sulfides include titanium sulfide (e.g., $TiS_2$), molybdenum sulfide (e.g., $MoS_2$), and iron sulfide (e.g., FeS, $FeS_2$, $Li_fFeS_2$ (wherein $0 \le f \le 1$)). Examples of metal nitrides include lithium cobalt nitride (e.g., $Li_gCo_hN$ wherein $0<g<4$, $0<h<0.5$).

From the perspective of increasing the battery voltage, it is preferred that the negative electrode of the non-aqueous secondary battery according to the present embodiment contains a material that dopes lithium ions at a lower potential than 0.4 V vs. $Li/Li^+$ as the negative-electrode active material. Examples of such a material include, in addition to carbon materials represented by amorphous carbon (hard carbon), artificial graphite, natural graphite, graphite, pyrolytic carbon, coke, glassy carbon, sintered compacts of organic polymer compounds, mesocarbon microbeads, carbon fiber, activated carbon, graphite, carbon colloid, and carbon black, metal lithium, metal oxides, metal nitrides, lithium alloys, tin alloys, silicon alloys, intermetallic compounds, organic compounds, inorganic compounds, metal complexes, and organic polymer compounds.

The negative-electrode active material can be used alone or in combination of two or more thereof. The number average particle size (primary particle size) of the negative-electrode active material is preferably 0.1 to 100 μm, and more preferably 1 to 10 μm. The number average particle size of the negative-electrode active material can be measured in the same manner as the number average particle size of the positive-electrode active material.

The negative electrode can be obtained as follows, for example. Namely, first, the conductive aid, binder and the like are optionally added to the above-described negative-electrode active material, and the resultant mixture is mixed to produce a negative electrode mixture. The negative electrode mixture is dispersed in a solvent to prepare a negative electrode mixture-containing slurry. Here, the solid content concentration in the negative electrode mixture-containing slurry is preferably 30 to 80 mass %, and more preferably 40 to 70 mass %. Next, this negative electrode mixture-containing slurry is coated on a negative electrode current collector, and then dried to form a coated layer. The coated layer obtained after the drying is compressed with a roll press or the like to form a negative-electrode active material layer. It is preferred that the thickness of the compressed negative-electrode active material layer is 10 to 300 μm, more preferably 20 to 280 μm, and even more preferably 30 to 250 μm.

The non-aqueous secondary battery according to the present embodiment is adjusted so that the basis weight of the negative-electrode active material layer included in the negative electrode is 3 to 46 mg/cm². If the greatest emphasis is placed on a high rate characteristic, this basis weight is preferably 4 to 23 mg/cm², and more preferably 5 to 12 mg/cm². On the other hand, from the perspective of improving volumetric energy density while maintaining a balance with the rate performance of the non-aqueous secondary battery, the basis weight is preferably 10 to 46 mg/cm², more preferably 11 to 37 mg/cm², and even more preferably 12 to 27 mg/cm². Since the non-aqueous secondary battery according to the present embodiment uses an electrolyte solution having an ion conductivity of 15 mS/cm or more, a non-aqueous secondary battery that realizes a high rate performance can be provided even when designing the electrode active material layer with a high volumetric energy density.

Although the porosity of the negative-electrode active material layer according to the present embodiment is not especially limited, in the non-aqueous secondary battery according to the present embodiment, from the perspective of improving volumetric energy density while maintaining a balance with rate performance, the porosity is preferably 20 to 45%, more preferably 22 to 42%, and even more preferably 25 to 35%. If the porosity is 20% or more, diffusion of the lithium ions in the negative-electrode active material layer is less susceptible to being hindered, and the rate characteristic is secured. Further, if the porosity of the negative-electrode active material layer is 45% or less, this tends to allow suppression of peeling degradation of the negative-electrode active material layer and drying out of the non-aqueous electrolyte solution, and enable durability performance to be secured while realizing higher rate.

Examples of the conductive aid include graphite, carbon black represented by acetylene black and Ketjen Black, and carbon fiber. The number average particle size (primary particle size) of the conductive aid is preferably 10 nm to 10 μm, and more preferably 20 nm to 1 μm. The number average particle size of the conductive aid is measured in the same manner as the number average particle size of the positive-electrode active material. Examples of the binder include PVDF, PTFE, polyacrylic acid, styrene-butadiene rubber, and fluorine rubber. Further, the solvent is not especially limited, and a conventionally known solvent may be used. Examples thereof include N-methyl-2-pyrrolidone, dimethylformamide, dimethylacetamide, water and the like.

The negative electrode current collector is formed from, for example, a metal foil, such as copper foil, nickel foil, or stainless steel foil. Further, the negative electrode current collector may be subjected to carbon coating, and may also be formed in a mesh shape. The thickness of the negative electrode current collector is preferably 5 to 40 μm, more preferably 6 to 35 μm, and even more preferably 7 to 30 μm.

<4. Conductive Layer>

A preferred mode of the positive electrode and the negative electrode that are included in the non-aqueous secondary battery according to the present embodiment is an electrode obtained by coating a conductive layer including a conductive material on the electrode current collector, and forming the positive-electrode active material layer or the negative-electrode active material layer thereon.

If a conductive layer is present on the electrode current collector, a high conductivity can be maintained, and the adhesive strength of the current collector with the active material layer can be increased. This enables a non-aqueous secondary battery to be produced that has both a high rate performance and high durability while still maintaining a high strength for the electrode. The conductive layer can be produced by preparing a conductive mixture-containing slurry by admixing a conductive material, a binder and the like, and dispersing the resultant conductive mixture in a solvent, then forming a conductive mixture layer by coating this conductive mixture-containing slurry on the positive electrode and negative electrode current collectors, drying, and then optionally pressing to adjust the thickness.

The conductive material included in the conductive layer is not especially limited, as long as it is conductive. Examples may include carbonaceous materials, such as activated carbon, non-graphitizing carbon, and graphitizing carbon, amorphous carbonaceous materials, such as a polyacene-based substance, carbon black, such as Ketjen Black and acetylene black, carbon nanotubes, fullerenes, carbon nanohorns, fibrous carbonaceous materials and the like. In particular, from perspectives such as a high conductivity and ease of conductive layer formation, it is preferred to use graphite and acetylene black. The number average particle size of the conductive material is preferably 20 nm to 1 µm, and more preferably 20 to 500 nm. The number average particle size of the conductive material can be measured in the same manner as the number average particle size of the positive-electrode active material.

Although the binder included in the conductive layer is not especially limited, it is preferred that the binder is stable in the electrolyte solution and against the charging/discharging behavior. Various kinds of resin can be used as the binder. Examples of such resins include alkane polymers, such as polyethylene, polypropylene, and poly-1,1-dimethyl ethylene; unsaturated polymers, such as polybutadiene and polyisoprene; polymers having a ring, such as polystyrene, polymethylstyrene, polyvinylpyridine, and poly-N-vinyl pyrrolidone; acrylic derivative polymers, such as polymethyl methacrylate, polyethyl methacrylate, polybutyl methacrylate, polymethyl acrylate, polyethyl acrylate, polyacrylic acid, polymethacrylic acid, and polyacrylamide; fluorine resins, such as polyvinyl fluoride, polyvinylidene fluoride, and polytetrafluoroethylene; and CN group-containing polymers, such as polyacrylonitrile and polyvinylidene cyanide; polyvinyl alcohol-based polymers, such as polyvinyl acetate and polyvinyl alcohol; halogen-containing polymers, such as polyvinyl chloride and polyvinylidene chloride; and conductive polymers, such as polyaniline. Further, a mixture, a modified form, a derivative, a random copolymer, an alternating copolymer, a graft copolymer, a block copolymer and the like of the above-described polymers may also be used.

The solid content concentration in the conductive mixture slurry formed from the above-described conductive material, the binder and the solvent is preferably 30 to 80 mass %, and more preferably 40 to 70 mass %.

Further, the thickness of the conductive layer is preferably 0.05 to 10 µm, and more preferably 0.1 to 10 µm. If the thickness of the conductive layer is 0.05 µm or more, the resistance between the electrode active material layer and the electrode current collector tends to decrease. If the thickness of the conductive layer is 10 µm or less, the decrease in the energy density as a storage element tends to be less. By forming the electrode active material layer on the conductive layer, the resistance between the electrode active material layer and the electrode current collector can be suppressed, and the adhesion between the electrode active material layer and the electrode current collector can be increased too.

<5. Separator>

From the perspectives of safety measures such as prevention of short-circuiting of the positive and negative electrodes and shutdown, it is preferred that the non-aqueous secondary battery according to the present embodiment have a separator between the positive electrode and the negative electrode. As the separator, the same separator as that included in a known non-aqueous secondary battery may be used. Preferably, the separator is an insulating thin film that has a large ion permeability and excellent mechanical strength. Examples of the separator include woven cloth, non-woven cloth, and a microporous membrane made from a synthetic resin. Among these, a microporous membrane made from a synthetic resin is preferred. As the microporous membrane made from a synthetic resin, it is preferred to use, for example, a microporous membrane containing polyethylene or polypropylene as a main component, or a microporous polyolefin membrane such as a microporous membrane containing both of these polyolefins. Examples of the non-woven cloth include a porous membrane made from ceramic or made from a heat-resistant resin, such as a polyolefin, a polyester, a polyamide, a liquid crystal polyester, and an aramid.

The separator may be formed from a single layer or laminated from a plurality of layers of one kind of microporous membrane, or laminated from a plurality of layers of two or more kinds of microporous membrane.

<6. Battery Casing>

The battery casing of the non-aqueous secondary battery according to the present embodiment is not especially limited. A battery can or a laminated film casing can be used for the battery casing. As a battery can, for example, a metal can formed from steel or aluminum can be used. As a laminated film casing, for example, a casing formed by superimposing two laminated films formed from a three-layer structure of a hot-melt resin/metal film/resin with the hot-melt resin side facing inwards, and sealing the end portions with a heat seal can be used. When a laminated film casing is used, the laminated film casing may be sealed in a state in which a positive electrode terminal (or a lead tap connected to the positive electrode terminal) and a negative electrode terminal (or a lead tap connected to the negative electrode terminal) are connected to the positive electrode current collector and the negative electrode current collector, respectively, and the end portion of both terminals (or lead tabs) is protruding from the casing.

<7. Battery Production Method>

The non-aqueous secondary battery according to the present embodiment can be produced by a known method using the above-described electrolyte solution, the positive electrode assembly formed from the positive electrode and the positive electrode current collector, the negative electrode assembly formed from the negative electrode and the negative electrode current collector, and optionally the separator. For example, the non-aqueous secondary battery can be molded into a laminate with a rolled structure by rolling a long positive electrode assembly and negative electrode assembly in a laminated state in which a long separator has been arranged therebetween. Further, they are cut into a plurality of sheets having a certain area and a certain shape and then non-aqueous secondary battery can be molded into a laminate with a layered structure in which the separator sheet is arranged between a plurality of positive electrode sheets and negative electrode sheets alternately laminated on one other. In addition, the non-aqueous secondary battery can be molded into a laminate with a layered structure by winding a long separator in a zigzag shape, and alternately inserting a positive electrode sheet and a negative electrode sheet between the zigzagged separators.

Next, the non-aqueous secondary battery according to the present embodiment can be produced by placing the laminate inside the battery case (battery casing), pouring the electrolyte solution according to the present embodiment into the battery case, dipping this laminate in the electrolyte solution, and sealing.

Alternatively, the non-aqueous secondary battery can also be produced by preparing in advance a gel-like electrolyte membrane by impregnating the non-aqueous electrolyte solution in a substrate, forming the laminate with a layered structure in the manner described above by using a sheet form positive electrode, negative electrode, the electrolyte membrane and optionally a separator, and then placing the laminate inside the battery case.

The shape of the non-aqueous secondary battery according to the present embodiment is not especially limited. For example, a cylindrical shape, an oval shape, a square cylindrical shape, a button shape, a coin shape, a flat shape, and a laminate shape may be preferably employed.

Although the non-aqueous secondary battery according to the present embodiment can function as a battery by an initial charging, the non-aqueous secondary battery stabilizes due to a portion of the non-aqueous electrolyte solution decomposing during the initial charging. The initial charging method is not especially limited. It is preferred to perform the initial charging at 0.001 to 0.3 C, more preferably at 0.002 to 0.25 C, and even more preferably at 0.003 to 0.2 C. Further, a preferable result is obtained by charging at a constant voltage during a part of the initial charging process. The constant current that discharges the rated capacity in 1 hour is 1 C. By setting the voltage range at which the lithium salt participates in the electrochemical reaction in a long range, a SEI is formed on the electrode surface, which has the effect of suppressing an increase in internal resistance including the positive electrode. Further, since a good effect is also conferred in some way to the parts other than the negative electrode, such as the positive electrode and the separator, without the reaction products being strongly fixed to just the negative electrode, carrying out initial charging is very effective in view of the electrochemical reaction of the lithium salt dissolved in the electrolyte solution.

The non-aqueous secondary battery according to the present embodiment can also be used as a battery pack in which a plurality of the non-aqueous secondary batteries are connected in series or in parallel. From the perspective of managing the charging/discharging state of the battery pack, it is preferred that the usage voltage range per battery is 2 to 5 V, more preferably 2.5 to 5 V, and especially preferably 2.75 V to 5 V.

Although an embodiment for carrying out the present invention was described above, the present invention is not limited to the above-described embodiment. The present invention may be variously modified as long as such modifications are within the scope of the invention.

EXAMPLES

The present invention will now be described in more detail based on the following examples. However, the present invention is not limited to these examples. Further, the various characteristics of the non-aqueous secondary battery were measured and evaluated as follows.

(1) Measurement (1-1) Non-Aqueous Electrolyte Solution Ion Conductivity Measurement A non-aqueous electrolyte solution was prepared in a polypropylene container. The ion conductivity measurement cell "CT-57101B" (trade name) manufactured by DKK-TOA Corporation connected to the ion conductivity meter "CM-30R" (trade name) manufactured by DKK-TOA Corporation was inserted into the above container housing the non-aqueous electrolyte solution, and the ion conductivity of the non-aqueous electrolyte solution was measured at 25° C.

(1-2) Electrode Active Material Layer Basis Weight

The basis weight of the electrode active material layer was calculated by the following formula (12).

$$\text{Basis weight [mg/cm}^2\text{]} = (\text{Electrode mass [mg]} - \text{electrode current collector mass [mg]})/\text{electrode area [cm}^2\text{]} \quad (12)$$

(1-3) Electrode Active Material Layer Porosity Measurement

The porosity of the electrode active material layer was determined by the following formula (13).

$$\text{Porosity [\%]} = (1 - \text{Actual electrode density [g/cm}^3\text{]}/\text{theoretical electrode density [g/cm}^3\text{]}) \times 100 \quad (13)$$

The actual electrode density was determined by dividing the mass of the electrode active material layer by the volume of the electrode active material layer. Here, the mass of the electrode active material layer was calculated by subtracting the mass of an electrode current collector separately punched out with a surface area of 2 cm$^2$ from the mass of an electrode punched out with a punch so as to have the same surface area. The volume of the electrode active material layer was calculated by multiplying the surface area by the thickness of the electrode active material layer, which is obtained by subtracting the thickness of a separately-measured electrode current collector from the thickness of the electrode measured with a micrometer. The theoretical electrode density was determined by multiplying the composition ratio by the density of the electrode active material, the conductive aid, and the binder that form the electrode, and adding the obtained values.

(1-4) Electrode Active Material Layer Thickness

The thickness of the electrode active material layer was determined by subtracting the thickness of a separately-measured electrode current collector from the thickness of the electrode measured with a micrometer.

(2) Positive Electrode Production

Positive electrodes were produced as follows.

(2-1) Production of Positive Electrode (P1)

A positive electrode mixture was obtained by mixing lithium cobalt oxide (LiCoO$_2$; density 4.95 g/cm$^3$) having a number average particle size of 7.4 μm as a positive-electrode active material, acetylene black (density 1.95 g/cm$^3$) having a number average particle size of 48 nm as a conductive aid, and polyvinylidene fluoride (PVdF; density 1.75 g/cm$^3$) as a binder in a mass ratio of 89.3:5.2:5.5. The obtained positive electrode mixture was further mixed with N-methyl-2-pyrrolidone as a solvent so that the solid content was 68 mass % to prepare a positive electrode mixture-containing slurry. This positive electrode mixture-containing slurry was coated by a doctor blade method onto one face of an aluminum foil having a thickness of 20 μm and a width of 200 mm serving as the positive electrode current collector while regulating the basis weight of the positive electrode mixture-containing slurry to 6.1 mg/cm$^2$, and the solvent was removed by drying. Then, a positive electrode (P1) formed from the positive-electrode active material layer and the positive electrode current collector was obtained by rolling with a roll press so that the actual electrode density was 2.77 g/cm$^3$. The theoretical electrode density was calculated to be 4.62 g/cm$^3$. The basis weight, electrode active material layer thickness, actual electrode density, and porosity are shown in Table 1.

(2-2) Production of Positive Electrode (P2)

A positive electrode (P2) was obtained in the same manner as in (2-1), except that the positive electrode mixture-containing slurry was coated by a doctor blade method while regulating the basis weight to 10.3 mg/cm$^2$, and the rolling was carried out by adjusting the roll press so that the actual electrode density was 2.58 g/cm³. The basis weight, electrode active material layer thickness, actual electrode density, and porosity are shown in Table 1.

(2-3) Production of Positive Electrode (P3)

A positive electrode (P3) was obtained in the same manner as in (2-1), except that the positive electrode mixture-containing slurry was coated by a doctor blade method while regulating the basis weight to 26.0 mg/cm², and the rolling was carried out by adjusting the roll press so that the actual electrode density was 3.17 g/cm³. The basis weight, electrode active material layer thickness, actual electrode density, and porosity are shown in Table 1.

(2-4) Production of Positive Electrode (P4)

A positive electrode (P4) was obtained in the same manner as in (2-1), except that the positive electrode mixture-containing slurry was coated by a doctor blade method while regulating the basis weight to 39.3 mg/cm², and the rolling was carried out by adjusting the roll press so that the actual electrode density was 3.20 g/cm³. The basis weight, electrode active material layer thickness, actual electrode density, and porosity are shown in Table 1.

(2-5) Production of Positive Electrode (P5)

A graphite carbon powder having a number average particle size of 3 μm as a conductive material and polyvinylidene fluoride (PVdF) as a binder were mixed in a mass ratio of 90:10. The obtained mixture was further mixed with N-methyl-2-pyrrolidone so that the solid content was 60 mass % to prepare a conductive mixture slurry. This conductive mixture slurry was coated onto one face of an aluminum foil having a thickness of 20 μm and a width of 200 mm, the solvent was removed by drying, and then the resultant conductive layer was rolled with a roll press. The thickness of the conductive layer was 5 μm.

A positive electrode (P5) was obtained in the same manner as in (2-1), except that the positive electrode mixture-containing slurry was coated by a doctor blade method onto the conductive layer while regulating the basis weight of the positive electrode mixture-containing slurry to 10.0 mg/cm², and the rolling was carried out while adjusting the roll press so that the actual electrode density was 2.50 g/cm³. The basis weight, electrode active material layer thickness, actual electrode density, and porosity are shown in Table 1.

(2-6) Production of Positive Electrode (P6)

A positive electrode (P6) was obtained in the same manner as in (2-1), except that an aluminum foil having a thickness of 30 μm was used as the positive electrode current collector, the positive electrode mixture-containing slurry was coated by a doctor blade method while regulating the basis weight to 24.6 mg/cm², and rolling was carried out by adjusting the roll press so that the actual electrode density was 3.00 g/cm³. The basis weight, electrode active material layer thickness, actual electrode density, and porosity are shown in Table 1.

(2-7) Production of Positive Electrode (P7)

A positive electrode (P7) was obtained in the same manner as in (2-5), except that the positive electrode mixture-containing slurry was coated by a doctor blade method while regulating the basis weight to 24.6 mg/cm², and the rolling was carried out by adjusting the roll press so that the actual electrode density was 3.00 g/cm³. The basis weight, electrode active material layer thickness, actual electrode density, and porosity are shown in Table 1.

TABLE 1

| Positive Electrode | Basis Weight [mg/cm²] | Electrode Active Material Layer Thickness [μm] | Actual Electrode Density [g/cm³] | Porosity [%] | Conductive Layer |
|---|---|---|---|---|---|
| P1 | 6.1 | 22 | 2.77 | 40 | No |
| P2 | 10.3 | 40 | 2.58 | 44 | No |
| P3 | 26.0 | 82 | 3.17 | 31 | No |
| P4 | 39.3 | 123 | 3.20 | 31 | No |
| P5 | 10.0 | 40 | 2.50 | 46 | Yes |
| P6 | 24.6 | 82 | 3.00 | 35 | No |
| P7 | 24.6 | 82 | 3.00 | 35 | Yes |

(2-8) Production of Positive Electrode (P8)

A positive electrode mixture was obtained by mixing a composite oxide of lithium and nickel, manganese, and cobalt (Ni/Mn/Co=1/1/1 (atom ratio); density 4.70 g/cm³) having a number average particle size of 11 μm as a positive-electrode active material, a graphite carbon power (density 2.26 g/cm³) having a number average particle size of 6.5 μm and an acetylene black powder (density 1.95 g/cm³) having a number average particle size of 48 nm as a conductive aid, and polyvinylidene fluoride (PVdF; density 1.75 g/cm³) as a binder in a mass ratio of 90.4:3.8:1.6:4.2. The obtained positive electrode mixture was further mixed with N-methyl-2-pyrrolidone as a solvent so that the solid content was 68 mass % to prepare a positive electrode mixture-containing slurry. This positive electrode mixture-containing slurry was coated by a doctor blade method onto one face of an aluminum foil having a thickness of 20 μm and a width of 200 mm serving as the positive electrode current collector while regulating the basis weight of the positive electrode mixture-containing slurry to 12.0 mg/cm², and the solvent was removed by drying. Then, a positive electrode (P8) formed from the positive-electrode active material layer and the positive electrode current collector was obtained by rolling with a roll press so that the actual electrode density was 3.24 g/cm³. The theoretical electrode density was calculated to be 4.44 g/cm³. The basis weight, electrode active material layer thickness, actual electrode density, and porosity are shown in Table 2.

(2-9) Production of Positive Electrode (P9)

A positive electrode (P9) was obtained in the same manner as in (2-8), except that the rolling was carried out by adjusting the roll press so that the actual electrode density was 3.02 g/cm³. The basis weight, electrode active material layer thickness, actual electrode density, and porosity are shown in Table 2.

(2-10) Production of Positive Electrode (P10)

A positive electrode (P10) was obtained in the same manner as in (2-8), except that the rolling was carried out by adjusting the roll press so that the actual electrode density was 2.66 g/cm³. The basis weight, electrode active material layer thickness, actual electrode density, and porosity are shown in Table 2.

(2-11) Production of Positive Electrode (P11)

A positive electrode (P11) was obtained in the same manner as in (2-8), except that the rolling with a roll press was not carried out. The basis weight, electrode active material layer thickness, actual electrode density, and porosity are shown in Table 2.

(2-12) Production of Positive Electrode (P12)

A graphite carbon powder having a number average particle size of 3 μm as a conductive material and polyvinylidene fluoride (PVdF) as a binder were mixed in a mass ratio of 90:10. The obtained mixture was further mixed with N-methyl-2-pyrrolidone so that the solid content was 60 mass % to prepare a conductive mixture slurry. This conductive mixture slurry was coated onto one face of an aluminum foil having a thickness of 20 μm and a width of 200 mm, the solvent was removed by drying, and then the resultant conductive layer was rolled with a roll press. The thickness of the conductive layer was 5 μm.

A positive electrode (P12) was obtained in the same manner as in (2-8), except that the positive electrode mixture-containing slurry was coated by a doctor blade method onto the conductive layer while regulating the basis weight of the positive electrode mixture-containing slurry to 12.0 mg/cm$^2$, and the rolling was carried out while adjusting the roll press so that the actual electrode density was 3.02 g/cm$^3$. The basis weight, electrode active material layer thickness, actual electrode density, and porosity are shown in Table 2.

(2-13) Production of Positive Electrode (P13)

A positive electrode (P13) was obtained in the same manner as in (2-8), except that the positive electrode mixture-containing slurry was coated by a doctor blade method while regulating the basis weight to 24.0 mg/cm$^2$, and the rolling was carried out by adjusting the roll press so that the actual electrode density was 2.90 g/cm$^3$. The basis weight, electrode active material layer thickness, actual electrode density, and porosity are shown in Table 2.

(2-14) Production of Positive Electrode (P14)

A positive electrode (P14) was obtained in the same manner as in (2-8), except that the positive electrode mixture-containing slurry was coated by a doctor blade method while regulating the basis weight to 36.0 mg/cm$^2$, and the rolling was carried out by adjusting the roll press so that the actual electrode density was 3.00 g/cm$^3$. The basis weight, electrode active material layer thickness, actual electrode density, and porosity are shown in Table 2.

TABLE 2

| Positive Electrode | Basis Weight [mg/cm$^2$] | Electrode Active Material Layer Thickness [μm] | Actual Electrode Density [g/cm$^3$] | Porosity [%] | Conductive Layer |
|---|---|---|---|---|---|
| P8 | 12.0 | 37 | 3.24 | 27 | No |
| P9 | 12.0 | 40 | 3.02 | 32 | No |
| P10 | 12.0 | 45 | 2.66 | 40 | No |
| P11 | 12.0 | 54 | 2.22 | 50 | No |
| P12 | 12.0 | 40 | 3.02 | 32 | Yes |
| P13 | 24.0 | 83 | 2.90 | 35 | No |
| P14 | 36.0 | 120 | 3.00 | 32 | No |

(2-15) Production of Positive Electrode (P15)

A composite oxide of lithium and nickel, manganese, and cobalt (Ni/Mn/Co=1/1/1 (atom ratio); density 4.70 g/cm$^3$) having a number average particle size of 11 μm as a positive-electrode active material, a graphite carbon power (density 2.26 g/cm$^3$) having a number average particle size of 6.5 μm and an acetylene black powder (density 1.95 g/cm$^3$) having a number average particle size of 48 nm as a conductive aid, and polyvinylidene fluoride (PVdF; density 1.75 g/cm$^3$) as a binder were prepared in a mass ratio of 100:4.2:1.8:4.5. Next, oxalic acid as a divalent or greater organic acid was adjusted so as to be 0.1 parts by mass based on 100 parts by mass of the positive-electrode active material, and it was then uniformly mixed with the positive-electrode active material and the conductive aid in a dry state. The obtained mixture was further mixed with the binder and N-methyl-2-pyrrolidone as a solvent so that the solid content was 68 mass % to prepare a positive electrode mixture-containing slurry. This positive electrode mixture-containing slurry was coated by a doctor blade method onto one face of an aluminum foil having a thickness of 20 μm and a width of 200 mm serving as the positive electrode current collector while regulating the basis weight of the positive electrode mixture-containing slurry to 24.9 mg/cm$^2$, and the solvent was removed by drying. Then, a positive electrode (P15) formed from the positive-electrode active material layer and the positive electrode current collector was obtained by rolling with a roll press so that the actual electrode density was 2.77 g/cm$^3$. The theoretical electrode density was calculated to be 4.44 g/cm$^3$. The basis weight, electrode active material layer thickness, actual electrode density, and porosity are shown in Table 3.

(2-16) Production of Positive Electrode (P16)

A positive electrode (P16) was obtained in the same manner as in (2-15), except that malonic acid was used as the organic acid. The basis weight, electrode active material layer thickness, actual electrode density, and porosity are shown in Table 3.

(2-17) Production of Positive Electrode (P17)

A positive electrode (P17) was obtained in the same manner as in (2-15), except that an organic acid was not used. The basis weight, electrode active material layer thickness, actual electrode density, and porosity are shown in Table 3.

(2-18) Production of Positive Electrode (P18)

A positive electrode (P18) was obtained in the same manner as in (2-15), except that acetic acid was used as the organic acid. The basis weight, electrode active material layer thickness, actual electrode density, and porosity are shown in Table 3.

(2-19) Production of Positive Electrode (P19)

A positive electrode (P19) was obtained in the same manner as in (2-15), except that the positive electrode mixture-containing slurry was coated by a doctor blade method while regulating the basis weight to 35.6 mg/cm$^2$, and the rolling was carried out by adjusting the roll press so that the actual electrode density was 2.94 g/cm$^3$. The basis weight, electrode active material layer thickness, actual electrode density, and porosity are shown in Table 3.

(2-20) Production of Positive Electrode (P20)

A positive electrode mixture was obtained by mixing a composite oxide of lithium and nickel, manganese, and cobalt (Ni/Mn/Co=1/1/1 (atom ratio); density 4.70 g/cm$^3$) having a number average particle size of 11 μm as a positive-electrode active material, a graphite carbon power (density 2.26 g/cm$^3$) having a number average particle size of 6.5 μm and an acetylene black powder (density 1.95 g/cm$^3$) having a number average particle size of 48 nm as a conductive aid, and polyvinylidene fluoride (PVdF; density 1.75 g/cm$^3$) as a binder in a mass ratio of 90.4:3.8:1.6:4.2. The obtained positive electrode mixture was further mixed with N-methyl-2-pyrrolidone as a solvent so that the solid content was 70 mass % to prepare a positive electrode mixture-containing slurry. A positive electrode (P20) was obtained in the same manner as in (2-8), except that the positive electrode mixture-containing slurry was coated by a doctor blade method while regulating the basis weight to 48.2 mg/cm$^2$, and the rolling was carried out by adjusting the roll press so that the actual electrode density was 2.47 g/cm$^3$. The basis weight, electrode active material layer thickness, actual electrode density, and porosity are shown in Table 3.

TABLE 3

| Positive Electrode | Basis Weight [mg/cm$^2$] | Electrode Active Material Layer Thickness [μm] | Actual Electrode Density [g/cm$^3$] | Porosity [%] | Organic acid |
|---|---|---|---|---|---|
| P15 | 24.9 | 90 | 2.77 | 38 | Oxalic acid |
| P16 | 24.9 | 90 | 2.77 | 38 | Malonic acid |
| P17 | 24.9 | 90 | 2.77 | 38 | No |
| P18 | 24.9 | 90 | 2.77 | 38 | Acetic acid |
| P19 | 35.6 | 121 | 2.94 | 34 | Oxalic acid |
| P20 | 48.2 | 195 | 2.47 | 44 | No |

(3) Negative Electrode Production

Negative electrodes were produced as follows.

(3-1) Production of Negative Electrode (N1)

A negative electrode mixture was obtained by mixing a graphite carbon powder (trade name "MCMB 25-28", manufactured by Osaka Gas Chemicals Co., Ltd., density 2.25 g/cm$^3$) having a number average particle size of 25 μm as a negative-electrode active material, acetylene black (density 1.95 g/cm$^3$) having a number average particle size of 48 nm as a conductive aid, and polyvinylidene fluoride (PVdF; density 1.75 g/cm$^3$) as a binder in a mass ratio of 93.0:2.0:5.0. The obtained negative electrode mixture was further mixed with N-methyl-2-pyrrolidone as a solvent so that the solid content was 45 mass % to prepare a negative electrode mixture-containing slurry. This negative electrode mixture-containing slurry was coated by a doctor blade method onto one face of a copper foil having a thickness of 18 μm and a width of 200 mm serving as the negative electrode current collector while regulating the basis weight of the negative electrode mixture-containing slurry to 2.3 mg/cm$^2$, and the solvent was removed by drying. Then, a negative electrode (N1) formed from the negative-electrode active material layer and the negative electrode current collector was obtained by rolling with a roll press so that the actual electrode density was 1.15 g/cm$^3$. The theoretical electrode density was calculated to be 2.22 g/cm$^3$. The basis weight, electrode active material layer thickness, actual electrode density, and porosity are shown in Table 4.

(3-2) Production of Negative Electrode (N2)

A negative electrode (N2) was obtained in the same manner as in (3-1), except that the negative electrode mixture-containing slurry was coated by a doctor blade method while regulating the basis weight to 4.1 mg/cm$^2$, and the rolling was carried out by adjusting the roll press so that the actual electrode density was 1.41 g/cm$^3$. The basis weight, electrode active material layer thickness, actual electrode density, and porosity are shown in Table 4.

(3-3) Production of Negative Electrode (N3)

A negative electrode (N3) was obtained in the same manner as in (3-1), except that the negative electrode mixture-containing slurry was coated by a doctor blade method while regulating the basis weight to 12.0 mg/cm$^2$, and the rolling was carried out by adjusting the roll press so that the actual electrode density was 1.45 g/cm$^3$. The basis weight, electrode active material layer thickness, actual electrode density, and porosity are shown in Table 4.

(3-4) Production of Negative Electrode (N4)

A negative electrode (N4) was obtained in the same manner as in (3-1), except that the negative electrode mixture-containing slurry was coated by a doctor blade method while regulating the basis weight to 18.0 mg/cm$^2$, and the rolling was carried out by adjusting the roll press so that the actual electrode density was 1.18 g/cm$^3$. The basis weight, electrode active material layer thickness, actual electrode density, and porosity are shown in Table 4.

(3-5) Production of Negative Electrode (N5)

A negative electrode (N5) was obtained in the same manner as in (3-1), except that the negative electrode mixture-containing slurry was coated by a doctor blade method while regulating the basis weight to 11.8 mg/cm$^2$, and the rolling was carried out by adjusting the roll press so that the actual electrode density was 1.42 g/cm$^3$. The basis weight, electrode active material layer thickness, actual electrode density, and porosity are shown in Table 4.

(3-6) Production of Negative Electrode (N6)

A negative electrode mixture was obtained by mixing Li$_4$Ti$_5$O$_{12}$ (density 3.30 g/cm$^3$) having a number average particle size of 7.4 μm as a negative-electrode active material, acetylene black (density 1.95 g/cm$^3$) having a number average particle size of 48 nm as a conductive aid, and polyvinylidene fluoride (PVdF; density 1.75 g/cm$^3$) as a binder in a mass ratio of 82.0:8.0:10.0. The obtained negative electrode mixture was further mixed with N-methyl-2-pyrrolidone as a solvent so that the solid content was 45 mass % to prepare a negative electrode mixture-containing slurry. This negative electrode mixture-containing slurry was coated by a doctor blade method onto one face of a copper foil having a thickness of 18 μm and a width of 200 mm serving as the negative electrode current collector while regulating the basis weight of the negative electrode mixture-containing slurry to 29.4 mg/cm$^2$, and the solvent was removed by drying. Then, a negative electrode (N6) formed from the negative-electrode active material layer and the negative electrode current collector was obtained by rolling with a roll press so that the actual electrode density was 1.86 g/cm$^3$. The theoretical electrode density was calculated to be 3.04 g/cm$^3$. The basis weight, electrode active material layer thickness, actual electrode density, and porosity are shown in Table 4.

TABLE 4

| Negative Electrode | Basis Weight [mg/cm$^2$] | Electrode Active Material Layer Thickness [μm] | Actual Electrode Density [g/cm$^3$] | Porosity [%] |
|---|---|---|---|---|
| N1 | 2.3 | 20 | 1.15 | 48 |
| N2 | 4.1 | 29 | 1.41 | 36 |
| N3 | 12.0 | 83 | 1.45 | 35 |
| N4 | 18.0 | 152 | 1.18 | 47 |
| N5 | 11.8 | 83 | 1.42 | 36 |
| N6 | 29.4 | 158 | 1.86 | 39 |

(3-7) Production of Negative Electrode (N7)

A negative electrode mixture was obtained by mixing a graphite carbon powder (density 2.23 g/cm$^3$) having a number average particle size of 12.7 μm and a graphite carbon powder (density 2.27 g/cm$^3$) having a number average particle size of 6.5 μm as a negative-electrode active material, a carboxymethyl cellulose (density 1.60 g/cm$^3$) solution (solid content concentration 1.83 mass %) as a binder, and a diene-based rubber (glass transition temperature: −5° C., dry number average particle size: 120 nm, density 1.00 g/cm$^3$, dispersion solvent: water, solid content concentration 40 mass %) in a solid content mass ratio of 87.2:9.7:1.4:1.7. The obtained negative electrode mixture was further mixed with water as a solvent so that the solid content was 45 mass % to prepare a negative electrode mixture-containing slurry. This negative electrode mixture-containing slurry was coated by a doctor blade method onto one face of a copper foil having a thickness of 10 μm and a width of 200 mm serving as the negative electrode current collector while regulating the basis weight of the negative electrode mixture-containing slurry to 5.5 mg/cm², and the solvent was removed by drying. Then, a negative electrode (N7) formed from the negative-electrode active material layer and the negative electrode current collector was obtained by rolling with a roll press so that the actual electrode density was 1.62 g/cm³. The theoretical electrode density was calculated to be 2.20 g/cm³. The basis weight, electrode active material layer thickness, actual electrode density, and porosity are shown in Table 5.

(3-8) Production of Negative Electrode (N8)

A negative electrode (N8) was obtained in the same manner as in (3-7), except that the rolling was carried out by adjusting the roll press so that the actual electrode density was 1.50 g/cm³. The basis weight, electrode active material layer thickness, actual electrode density, and porosity are shown in Table 5.

(3-9) Production of Negative Electrode (N9)

A negative electrode (N9) was obtained in the same manner as in (3-7), except that the rolling was carried out by adjusting the roll press so that the actual electrode density was 1.32 g/cm³. The basis weight, electrode active material layer thickness, actual electrode density, and porosity are shown in Table 5.

(3-10) Production of Negative Electrode (N10)

A negative electrode (N10) was obtained in the same manner as in (3-7), except that the rolling with a roll press was not carried out. The basis weight, electrode active material layer thickness, actual electrode density, and porosity are shown in Table 5.

(3-11) Production of Negative Electrode (N11)

A negative electrode (N11) was obtained in the same manner as in (3-7), except that the negative electrode mixture-containing slurry was coated by a doctor blade method while regulating the basis weight to 10.6 mg/cm², and the rolling was carried out by adjusting the roll press so that the actual electrode density was 1.50 g/cm³. The basis weight, electrode active material layer thickness, actual electrode density, and porosity are shown in Table 5.

(3-12) Production of Negative Electrode (N12)

A negative electrode (N12) was obtained in the same manner as in (3-7), except that the negative electrode mixture-containing slurry was coated by a doctor blade method while regulating the basis weight to 10.0 mg/cm², and the rolling was carried out by adjusting the roll press so that the actual electrode density was 1.35 g/cm³. The basis weight, electrode active material layer thickness, actual electrode density, and porosity are shown in Table 5.

(3-13) Production of Negative Electrode (N13)

A negative electrode (N13) was obtained in the same manner as in (3-7), except that the negative electrode mixture-containing slurry was coated by a doctor blade method while regulating the basis weight to 16.0 mg/cm², and the rolling was carried out by adjusting the roll press so that the actual electrode density was 1.51 g/cm³. The basis weight, electrode active material layer thickness, actual electrode density, and porosity are shown in Table 5.

(3-14) Production of Negative Electrode (N14)

A negative electrode mixture was obtained by mixing a graphite carbon powder (density 2.23 g/cm³) having a number average particle size of 12.7 μm and a graphite carbon powder (density 2.27 g/cm³) having a number average particle size of 6.5 μm as a negative-electrode active material, a carboxymethyl cellulose (density 1.60 g/cm³) solution (solid content concentration 1.83 mass %) as a binder, and a diene-based rubber (glass transition temperature: −5° C., dry number average particle size: 120 nm, density 1.00 g/cm³, dispersion solvent: water, solid content concentration 40 mass %) in a solid content mass ratio of 87.2:9.7:1.4:1.7. The obtained negative electrode mixture was further mixed with water as a solvent so that the solid content was 48 mass % to prepare a negative electrode mixture-containing slurry. A negative electrode (N14) was obtained in the same manner as in (3-7), except that the negative electrode mixture-containing slurry was coated by a doctor blade method while regulating the basis weight to 21.4 mg/cm², and the rolling was carried out by adjusting the roll press so that the actual electrode density was 1.24 g/cm³. The basis weight, electrode active material layer thickness, actual electrode density, and porosity are shown in Table 5.

TABLE 5

| Negative Electrode | Basis Weight [mg/cm²] | Electrode Active Material Layer Thickness [μm] | Actual Electrode Density [g/cm³] | Porosity [%] |
|---|---|---|---|---|
| N7  | 5.5  | 34  | 1.62 | 27 |
| N8  | 5.5  | 37  | 1.50 | 32 |
| N9  | 5.5  | 42  | 1.32 | 40 |
| N10 | 5.5  | 50  | 1.10 | 50 |
| N11 | 10.6 | 71  | 1.50 | 32 |
| N12 | 10.0 | 74  | 1.35 | 39 |
| N13 | 16.0 | 106 | 1.51 | 32 |
| N14 | 21.4 | 172 | 1.24 | 44 |

(4) Electrolyte Solution Preparation (4-1) Solvent Preparation

Solvents (L1) to (L22) were prepared by mixing various organic solvents in predetermined volume ratios. The composition of each solvent is shown in Table 6. In Table 6, "AN" represents acetonitrile, "ADN" represents adiponitrile, "DMC" represents dimethyl carbonate, "EC" represents ethylene carbonate, "EMC" represents ethyl methyl carbonate, "GBL" represents γ-butyrolactone, and "PC" represents propylene carbonate, respectively.

TABLE 6

| No. | AN [Volume Ratio] | ADN [Volume Ratio] | DMC [Volume Ratio] | EC [Volume Ratio] | EMC [Volume Ratio] | GBL [Volume Ratio] | PC [Volume Ratio] |
|---|---|---|---|---|---|---|---|
| L1  | 0   | 0 | 0    | 32 | 63 | 0    | 0  |
| L2  | 20  | 0 | 0    | 20 | 47 | 0    | 0  |
| L3  | 56  | 0 | 0    | 0  | 0  | 29   | 0  |
| L4  | 70  | 0 | 0    | 0  | 0  | 20.4 | 0  |
| L5  | 15  | 0 | 0    | 25 | 50 | 0    | 0  |
| L6  | 56  | 0 | 29   | 0  | 0  | 0    | 0  |
| L7  | 70  | 0 | 20.4 | 0  | 0  | 0    | 0  |
| L8  | 15  | 0 | 0    | 25 | 50 | 0    | 0  |
| L9  | 70  | 0 | 20.4 | 0  | 0  | 0    | 0  |
| L10 | 90  | 0 | 0    | 2  | 0  | 0    | 0  |
| L11 | 60  | 0 | 0    | 0  | 0  | 0    | 29 |
| L12 | 40  | 0 | 0    | 0  | 0  | 0    | 48 |
| L13 | 100 | 0 | 0    | 0  | 0  | 0    | 0  |
| L14 | 0   | 0 | 0    | 1  | 2  | 0    | 0  |
| L15 | 4   | 1 | 0    | 0  | 0  | 0    | 0  |
| L16 | 62  | 0 | 0    | 23 | 0  | 0    | 0  |
| L17 | 61  | 0 | 0    | 0  | 0  | 0    | 25 |
| L18 | 50  | 0 | 0    | 0  | 40 | 0    | 0  |
| L19 | 30  | 0 | 0    | 0  | 0  | 0    | 60 |
| L20 | 50  | 0 | 0    | 0  | 0  | 0    | 40 |
| L21 | 75  | 0 | 0    | 0  | 0  | 0    | 7  |
| L22 | 75  | 0 | 0    | 7  | 0  | 0    | 0  |

(4-2) Preparation of Electrolyte Solutions (α) (Method 1)

The solvents prepared in the above (4-1) were mixed with the various additives to a predetermined concentration respectively, and the resultant mixtures were further mixed with a lithium salt to a predetermined concentration to prepare (S1) to (S27) as electrolyte solutions (α). These electrolyte solutions (α) were subjected to the measurement described in the above (1-1). The results are shown in Table 7. Further, in Table 7, "VC" represents vinylene carbonate, "FEC" represents 4-fluoro-1,3-dioxolan-2-one, "ES" represents ethylene sulfite, "1,3-PS" represents 1,3-propane sultone, "TMSO" represents tetramethylene sulfoxide, "SL" represents sulfolane, "3-SLE" represents 3-sulfolene, "LiPF$_6$" represents lithium hexafluorophosphate, "LiBF$_4$" represents lithium tetrafluoroborate, and "LiBOB" represents lithium bis(oxalato)borate, respectively.

TABLE 7

| | Electrolyte Solution (α) Solvent + Additive | | | | | |
|---|---|---|---|---|---|---|
| | Solvent | | Additive 1 | | Additive 2 | |
| No. | Solvent Type | Concentration [vol. %] | Additive Type | Concentration [vol. %] | Additive Type | Concentration [vol. %] |
| S1 | L1 | 95 | VC | 5 | — | — |
| S2 | L2 | 87 | VC | 10 | ES | 3 |
| S3 | L3 | 85 | VC | 11 | ES | 4 |
| S4 | L4 | 90.4 | VC | 7.5 | ES | 2.1 |
| S5 | L5 | 90 | VC | 10 | — | — |
| S6 | L6 | 85 | VC | 11 | ES | 4 |
| S7 | L7 | 90.4 | VC | 7.5 | ES | 2.1 |
| S8 | L8 | 90 | VC | 10 | ES | 0 |
| S9 | L9 | 90.4 | VC | 7.5 | ES | 2.1 |
| S10 | L10 | 92 | VC | 8 | — | — |
| S11 | L11 | 89 | VC | 9 | ES | 2 |
| S12 | L12 | 88 | VC | 9 | ES | 3 |
| S13 | L13 | 85 | VC | 11 | ES | 4 |
| S14 | L13 | 81 | VC | 15 | ES | 4 |
| S15 | L13 | 81 | VC | 15 | 1,3-PS | 4 |
| S16 | L13 | 81 | VC | 11 | TMSO | 8 |
| S17 | L13 | 81 | VC | 11 | SL | 8 |
| S18 | L16 | 85 | FEC | 10 | 3-SLE | 5 |
| S19 | L17 | 86 | FEC | 10 | ES | 4 |
| S20 | L18 | 90 | VC | 10 | — | — |
| S21 | L19 | 90 | VC | 10 | — | — |
| S22 | L20 | 90 | VC | 10 | — | — |
| S23 | L21 | 82 | VC | 13 | SL | 5 |
| S24 | L22 | 82 | FEC | 13 | SL | 5 |
| S25 | L13 | 87 | FEC | 13 | — | — |
| S26 | L13 | 87 | FEC | 17 | — | — |
| S27 | L13 | 87 | VC | 13 | — | — |

| | Electrolyte Solution (α) Lithium Salt | | | |
|---|---|---|---|---|
| No. | LiPF$_6$ Concentration [mol/L] | LiBF$_4$ Concentration [mol/L] | LiBOB Concentration [mol/L] | Ion Conductivity [mS/cm] |
| S1 | 1 | — | — | 9.0 |
| S2 | 1 | — | — | 18.6 |
| S3 | 1 | — | — | 24.0 |
| S4 | 1 | — | — | 31.0 |
| S5 | — | — | 0.5 | 16.0 |
| S6 | 1 | — | — | 28.0 |
| S7 | 1 | — | — | 35.0 |
| S8 | — | — | 0.5 | 16.0 |
| S9 | 1 | — | — | 35.0 |
| S10 | 1.3 | — | 0.1 | 40.0 |
| S11 | 1.3 | — | — | 27.0 |
| S12 | 1.3 | — | — | 17.0 |
| S13 | 1 | — | — | 37.0 |
| S14 | 1 | — | — | 36.4 |
| S15 | 1.5 | — | — | 41.0 |
| S16 | 1 | — | 0.5 | 27.6 |
| S17 | 1.5 | — | — | 37.2 |
| S18 | 1.3 | — | 0.1 | 32.0 |
| S19 | 1.3 | — | 0.1 | 30.5 |
| S20 | — | 0.8 | 0.2 | 15.5 |
| S21 | — | 0.8 | 0.2 | 10.4 |
| S22 | — | 0.8 | 0.2 | 17.4 |
| S23 | — | 0.8 | 0.2 | 23.1 |
| S24 | — | 0.8 | 0.2 | 23.5 |
| S25 | 1.3 | — | 0.1 | 43.8 |
| S26 | 1.3 | — | 0.1 | 37.4 |
| S27 | 1.3 | — | 0.1 | 45.2 |

(4-3) Preparation of Electrolyte Solutions (γ) (Method 2)

An electrolyte solution (β) was prepared by adding a lithium salt to a solvent to a predetermined concentration (hereinafter, the electrolyte solution (β) before adding the additives is referred to as "mother electrolyte solution (β)"). The various additives and a dinitrile compound were mixed into this mother electrolyte solution (β) to a predetermined concentration to obtain electrolyte solutions (γ). The electrolyte solutions (γ) obtained by this preparation method are shown in (S28) to (S48) in Table 8. In Table 8, "SN" represents succinonitrile.

TABLE 8

| | Electrolyte Solution (γ) Mother Electrolyte Solution (β) | | | |
|---|---|---|---|---|
| No. | Solvent | $LiPF_6$ Concentration [mol/L] | LiTFSI Concentration [mol/L] | LiBOB Concentration [mol/L] |
| S28 | L13 | 0.1 | — | 0.9 |
| S29 | L13 | 1 | 0.05 | — |
| S30 | L13 | — | — | 1 |
| S31 | L13 | 0.1 | — | 0.9 |
| S32 | L13 | 0.1 | — | 0.9 |
| S33 | L13 | 0.5 | — | 1 |
| S34 | L13 | 1 | 0.05 | 0.1 |
| S35 | L13 | 1 | 0.05 | — |
| S36 | L13 | — | — | 1 |
| S37 | L13 | 1 | — | 0.5 |
| S38 | L13 | 1.3 | — | — |
| S39 | L13 | 0.9 | — | 0.1 |
| S40 | L13 | 1 | — | — |
| S41 | L14 | 1 | — | — |
| S42 | L14 | 1 | — | — |
| S43 | L13 | 1 | — | — |
| S44 | L13 | 1 | — | — |
| S45 | L13 | 1 | — | — |
| S46 | L13 | 1 | — | — |
| S47 | L15 | 1 | — | — |
| S48 | L13 | 1.5 | — | — |

| | Electrolyte Solution (γ) Additives | | | | | | |
|---|---|---|---|---|---|---|---|
| | Additive 1 | | Additive 2 | | Dinitrile | | Ion |
| No. | Additive Type | Concentration [mass %] | Additive Type | Concentration [mass %] | Additive Type | Concentration [mass %] | Conductivity [mS/cm] |
| S28 | VC | 10 | — | — | — | — | 26.8 |
| S29 | VC | 20 | — | — | — | — | 42.7 |
| S30 | FEC | 10 | — | — | — | — | 22.0 |
| S31 | VC | 10 | — | — | SN | 1.5 | 26.3 |
| S32 | FEC | 10 | — | — | — | — | 26.0 |
| S33 | VC | 10 | — | — | — | — | 28.4 |
| S34 | VC | 5 | FEC | 5 | — | — | 40.7 |
| S35 | FEC | 20 | — | — | — | — | 33.9 |
| S36 | VC | 10 | ES | 3 | — | — | 23.0 |
| S37 | VC | 10 | ES | 3 | — | — | 35.0 |
| S38 | VC | 10 | ES | 3 | — | — | 45.4 |
| S39 | VC | 10 | ES | 3 | — | — | 38.8 |
| S40 | VC | 10 | ES | 3 | — | — | 40.3 |
| S41 | — | — | — | — | — | — | 9.6 |
| S42 | VC | 10 | ES | 3 | — | — | 7.3 |
| S43 | VC | 10 | ES | 3 | SN | 1.5 | 39.0 |
| S44 | VC | 10 | ES | 6 | — | — | 35.8 |
| S45 | VC | 10 | ES | 1.5 | — | — | 43.3 |
| S46 | VC | 10 | ES | 3 | ADN | 1.5 | 39.2 |
| S47 | VC | 10 | ES | 3 | — | — | 27.3 |
| S48 | VC | 10 | ES | 3 | — | — | 47.8 |

(5) Production of Evaluation Battery

Various batteries were produced by combining the electrodes and electrolyte solutions obtained by the above-described methods. The specific production methods were as follows.

(5-1) Production of a Compact Non-Aqueous Secondary Battery

A laminate was obtained by superimposing a positive electrode obtained as described above that had been punched out into a disc shape with a diameter of 16 mm and a negative electrode obtained as described above that had been punched out into a disc shape with a diameter of 16 mm on either side of a separator (membrane thickness 25 μm, porosity 50%, pore diameter 0.1 μm to 1 μm) formed from polyethylene. This laminate was inserted into a disc-type battery case made from SUS. Next, a compact non-aqueous secondary battery was obtained by pouring 0.5 mL of electrolyte solution into the battery case, dipping the laminate in the electrolyte solution, then sealing the battery case, and then holding for 24 hours at 25° C. to sufficiently condition the electrolyte solution.

(5-2) Production of a Coin-Type Non-Aqueous Secondary Battery

A polypropylene gasket was set in a CR 2032 type battery case (SUS 304/Al clad), and a positive electrode obtained as described above that had been punched out into a disc shape with a diameter of 16 mm was set in the center of the gasket so that the positive-electrode active material layer was facing upwards. A sheet of glass fiber filter paper (glass fiber filter paper manufactured by Advantec Co., Ltd., GA-100) that had been punched out into a disc shape with a diameter of 16 mm was set on top of the positive electrode, 150 μL of electrolyte solution was poured in, and then a negative electrode obtained as described above that had been punched out into a disc shape with a diameter of 16 mm was set so that the negative-electrode active material layer was facing downwards. A spacer and a spring were set, a battery cap was then fitted, and the battery was crimped with a crimping device. Electrolyte solution that spilled out was wiped clean with a waste cloth. A coin-type non-aqueous secondary battery was obtained by holding for 24 hours at 25° C. to sufficiently condition the electrolyte solution.

(6) Evaluation

The thus-obtained evaluation batteries were subjected to an initial charging/discharging treatment and initial charging/discharging capacity measurement based on the following procedures (6-1) to (6-4). Then, based on the following (6-5) to (6-14), each battery was evaluated. The charging/discharging was carried out using the charging/discharging apparatus ACD-01 (trade name) manufactured by Aska Electronic Co., Ltd., and the thermostatic bath PLM-63S (trade name) manufactured by Futaba Co., Ltd.

Here, 1 C means the current value at which the discharging of a battery in a fully-charged state for 1 hour at a constant current is expected to finish. For cases other than the negative electrode (N6), this means the current value at which the discharging of a battery in a fully-charged state of 4.2 V for 1 hour at a constant current until 3.0 V is expected to finish. When the negative electrode (N6) was used, this means the current value at which the discharging of a battery in a fully-charged state of 2.7 V for 1 hour at a constant current until 1.5 V is expected to finish. The current value corresponding to 1 C for the positive electrodes (P1) to (P20) is shown in Table 9.

TABLE 9

| Positive Electrode | Current Value Corresponding to 1 C [mA] |
|---|---|
| P1 | 1.5 |
| P2 | 2.5 |
| P3 | 6.4 |
| P4 | 9.7 |
| P5 | 2.5 |
| P6 | 6.1 |
| P7 | 6.1 |
| P8 | 3.0 |
| P9 | 3.0 |
| P10 | 3.0 |
| P11 | 3.0 |
| P12 | 3.0 |
| P13 | 6.0 |
| P14 | 9.0 |
| P15 | 6.3 |
| P16 | 6.3 |
| P17 | 6.3 |
| P18 | 6.3 |

TABLE 9-continued

| Positive Electrode | Current Value Corresponding to 1 C [mA] |
|---|---|
| P19 | 8.9 |
| P20 | 12.1 |

(6-1) Compact Non-Aqueous Secondary Battery Initial Charging/Discharging Treatment (Condition 1)

The battery was charged at a constant current corresponding to 0.005 C, and after the voltage had reached 3.0 V, the battery was charged at a constant voltage of 3.0V. The charging was carried out for a total of 30 hours. Thereafter, the battery was further charged at a constant current corresponding to 0.2 C, and after the voltage had reached 4.2 V, the battery was charged at a constant voltage of 4.2V. The charging was carried out for a total of further 8 hours. Subsequently, discharging was carried out at a constant current corresponding to 0.3 C until 3.0 V was reached. The ambient temperature of the battery at this time was set at 25° C.

(6-2) Compact Non-Aqueous Secondary Battery Initial Charging/Discharging Treatment (Condition 2)

The battery was charged at a constant current corresponding to 0.3 C, and after the voltage had reached 4.2 V, the battery was charged at a constant voltage of 4.2V. The charging was carried out for a total of 8 hours. Subsequently, discharging was carried out at a constant current corresponding to 0.3 C until 3.0 V was reached. The ambient temperature of the battery at this time was set at 25° C.

(6-3) Compact Non-Aqueous Secondary Battery Initial Charging/Discharging Treatment (Condition 3)

The battery was charged at a constant current corresponding to 0.3 C, and after the voltage had reached 2.7 V, the battery was charged at a constant voltage of 2.7V. The charging was carried out for a total of 8 hours. Subsequently, discharging was carried out at a constant current corresponding to 0.3 C until 1.5 V was reached. The ambient temperature of the battery at this time was set at 25° C.

(6-4) Compact Non-Aqueous Secondary Battery Initial Charging/Discharging Treatment (Condition 4)

The battery was charged at a constant current corresponding to 0.1 C, and after the voltage had reached 4.2 V, the battery was charged at a constant voltage of 4.2V. The charging was carried out for a total of 15 hours. Subsequently, discharging was carried out at a constant current corresponding to 0.3 C until 3.0 V was reached. The ambient temperature of the battery at this time was set at 25° C.

(6-5) Measurement of Discharge Capacity of a Compact Non-Aqueous Secondary Battery at a High Rate (Rate Test 1)

The battery, on which an initial charging/discharging treatment had been carried out based on the method described in the above (6-1), was charged at a constant current corresponding to 1 C, and after the voltage had reached 4.2 V, the battery was charged at a constant voltage of 4.2V. The charging was carried out for a total of 3 hours. Then, discharging was carried out at a constant current corresponding to 10 C until 3.0 V was reached. The discharge capacity at this time was taken as the 10 C discharge capacity, and the discharge capacity in the above (6-1) was taken as the 0.3 C discharge capacity.

(6-6) Measurement of Discharge Capacity of a Compact Non-Aqueous Secondary Battery at a High Rate (Rate Test 2)

The battery, on which an initial charging/discharging treatment had been carried out based on the method described in the above (6-1), was charged at a constant current corresponding to 1 C, and after the voltage had reached 4.2 V, the battery was charged at a constant voltage of 4.2V. The charging was carried out for a total of 3 hours. Then, discharging was carried out at a constant current corresponding to 1 C until 3.0 V was reached. The discharge capacity at this time was taken as the 1 C discharge capacity. Next, charging was carried out by charging at a constant current corresponding to 1 C, and after the voltage had reached 4.2 V, the battery was charged at a constant voltage of 4.2V. The charging was carried out for a total of 3 hours. Then, discharging was carried out at a constant current corresponding to 10 C until 3.0 V was reached. The discharge capacity at this time was taken as the 10 C discharge capacity. Evaluation was carried out by, with the discharge capacity in the above (6-1) set at 0.3 C discharge capacity, when the 0.3 C discharge capacity reached 100%, evaluating batteries that exhibited a 1 C or 10 C discharge capacity of 75% or more as excellent, evaluating batteries that exhibited a 1 C or 10 C discharge capacity of 65% or more to less than 75% as good, evaluating batteries that exhibited a 1 C or 10 C discharge capacity of 55% or more to less than 65% as fair, and evaluating batteries that exhibited a 1 C or 10 C discharge capacity of less than 55% as poor.

(6-7) Measurement of Discharge Capacity of a Compact Non-Aqueous Secondary Battery at a High Rate (Rate Test 3)

The battery, on which an initial charging/discharging treatment had been carried out based on the method described in the above (6-1), was charged at a constant current corresponding to 1 C, and after the voltage had reached 4.2 V, the battery was charged at a constant voltage of 4.2V. The charging was carried out for a total of 3 hours. Then, discharging was carried out at a constant current corresponding to 1 C until 3.0 V was reached. The discharge capacity at this time was taken as the 1 C discharge capacity. Next, charging was carried out by charging at a constant current corresponding to 1 C, and after the voltage had reached 4.2 V, the battery was charged at a constant voltage of 4.2V. The charging was carried out for a total of 3 hours. Then, discharging was carried out at a constant current corresponding to 3 C until 3.0 V was reached. The discharge capacity at this time was taken as the 3 C discharge capacity. Next, charging was carried out by charging at a constant current corresponding to 1 C, and after the voltage had reached 4.2 V, the battery was charged at a constant voltage of 4.2V. The charging was carried out for a total of 3 hours. Then, discharging was carried out at a constant current corresponding to 5 C until 3.0 V was reached. The discharge capacity at this time was taken as the 5 C discharge capacity. Next, charging was carried out by charging at a constant current corresponding to 1 C, and after the voltage had reached 4.2 V, the battery was charged at a constant voltage of 4.2V. The charging was carried out for a total of 3 hours. Then, discharging was carried out at a constant current corresponding to 10 C until 3.0 V was reached. The discharge capacity at this time was taken as the 10 C discharge capacity. Evaluation was carried out by, with the discharge capacity in the above (6-1) set at 0.3 C discharge capacity, when the 0.3 C discharge capacity reached 100%, evaluating batteries that exhibited a 1 C, 3 C, 5 C, or 10 C discharge capacity of 40% or more as excellent, evaluating batteries that exhibited a 1 C, 3 C, 5 C, or 10 C discharge capacity of 20% or more to less than 40% as good, and evaluating batteries that exhibited a 1 C, 3 C, 5 C, or 10 C discharge capacity of less than 20% as poor.

(6-8) Measurement of Discharge Capacity of a Compact Non-Aqueous Secondary Battery at a High Rate (Rate Test 4)

The battery, on which an initial charging/discharging treatment had been carried out based on the method described in the above (6-3), was charged at a constant current corresponding to 1 C, and after the voltage had reached 2.7 V, the battery was charged at a constant voltage of 2.7V. The charging was carried out for a total of 3 hours. Then, discharging was carried out at a constant current corresponding to 1 C until 1.5 V was reached. The discharge capacity at this time was taken as the 1 C discharge capacity. Next, charging was carried out by charging at a constant current corresponding to 1 C, and after the voltage had reached 2.7 V, the battery was charged at a constant voltage of 2.7V. The charging was carried out for a total of 3 hours. Then, discharging was carried out at a constant current corresponding to 3 C until 1.5 V was reached. The discharge capacity at this time was taken as the 3 C discharge capacity. Next, charging was carried out by charging at a constant current corresponding to 1 C, and after the voltage had reached 2.7 V, the battery was charged at a constant voltage of 2.7V. The charging was carried out for a total of 3 hours. Then, discharging was carried out at a constant current corresponding to 5 C until 1.5 V was reached. The discharge capacity at this time was taken as the 5 C discharge capacity. Next, charging was carried out by charging at a constant current corresponding to 1 C, and after the voltage had reached 2.7 V, the battery was charged at a constant voltage of 2.7V. The charging was carried out for a total of 3 hours. Then, discharging was carried out at a constant current corresponding to 10 C until 1.5 V was reached. The discharge capacity at this time was taken as the 10 C discharge capacity. Evaluation was carried out by, with the discharge capacity in the above (6-3) set at 0.3 C discharge capacity, when the 0.3 C discharge capacity reached 100%, evaluating batteries that exhibited a 1 C, 3 C, 5 C, or 10 C discharge capacity of 40% or more as excellent, evaluating batteries that exhibited a 1 C, 3 C, 5 C, or 10 C discharge capacity of 20% or more to less than 40% as good, and evaluating batteries that exhibited a 1 C, 3 C, 5 C, or 10 C discharge capacity of less than 20% as poor.

(6-9) Measurement of Discharge Capacity of a Compact Non-Aqueous Secondary Battery at a High Rate (Rate Test 5)

The battery, on which an initial charging/discharging treatment had been carried out based on the method described in the above (6-1) or (6-2), was carried out by charging at a constant current corresponding to 1 C, and after the voltage had reached 4.2 V, the battery was charged at a constant voltage of 4.2V. The charging was carried out for a total of 3 hours. Then, discharging was carried out at a constant current corresponding to 1 C until 3.0 V was reached. The discharge capacity at this time was taken as A. Next, charging was carried out by charging at a constant current corresponding to 1 C, and after the voltage had reached 4.2 V, the battery was charged at a constant voltage of 4.2V. The charging was carried out for a total of 3 hours. Then, discharging was carried out at a constant current corresponding to 5 C until 3.0 V was reached. The discharge capacity at this time was taken as B. As the rate test measurement value, 100×B/A [%] was determined.

(6-10) Cycle Test of Compact Non-Aqueous Secondary Battery at 50° C. (Cycle Test 1)

The charging/discharging cycle test at 50° C. was carried out on the battery that had been subjected to the rate test based on the method described in the above (6-9). First, charging was carried out by charging at a constant current corresponding to 1 C, and after the voltage had reached 4.2 V, the battery was charged at a constant voltage of 4.2V. The charging was carried out for a total of 3 hours. Discharging was carried out at a constant current corresponding to 1 C until 3.0 V was reached. With this process of performing charging and discharging once each serving as one cycle, charging/discharging was carried out for 25 cycles. It is noted that the discharging in the first and the twenty-fifth cycles was carried out at a constant current corresponding to 0.3 C instead of 1 C. If a sufficient discharge capacity was maintained even after 25 cycles were finished, the same operation as this was repeated again. The discharge capacity ratio at each cycle based on the discharge capacity at the second cycle of 100% was taken as the discharge capacity retention rate. Measurement was terminated when the discharge capacity retention rate became less than 10%. The ambient temperature of the batteries at this time was set at 50° C.

(6-11) Cycle Test of Compact Non-Aqueous Secondary Battery at 50° C. (Cycle Test 2)

The charging/discharging cycle test at 50° C. was carried out on the battery that had been subjected to an initial charging/discharging treatment based on the method described in the above (6-4). First, charging was carried out by charging at a constant current corresponding to 1 C, and after the voltage had reached 4.2 V, the battery was charged at a constant voltage of 4.2V. The charging was carried out for a total of 3 hours. Discharging was carried out at a constant current corresponding to 1 C until 3.0 V was reached. With this process of performing charging and discharging once each serving as one cycle, charging/discharging was repeated until the charging performed in the fiftieth cycle. The discharge capacity ratio at the forty-ninth cycle based on a discharge capacity at the first cycle of 100% was taken as the discharge capacity retention rate. The ambient temperature of the batteries at this time was set at 50° C.

(6-12) Measurement of Electrochemical Impedance Spectroscopy of Compact Non-Aqueous Secondary Battery (EIS Measurement 1)

The electrochemical impedance spectroscopy measurement was carried out using the Frequency Response Analyzer 1400 (trade name) manufactured by Solartron, and the Potentio Galvanostat 1470E (trade name) manufactured by Solartron. The non-aqueous secondary batteries used for this measurement were batteries that had been subjected to an initial charging/discharging treatment by repeatedly charging and discharging as described in the above (6-10), and batteries after the twenty-fifth cycle and the one-hundredth cycle, that were then charged by charging at a constant current corresponding to 1 C until 4.0 V was reached, and then at 4.0 V for a total of 3 hours. As the measurement conditions, the amplitude was set at ±5 mV, and the frequency at 0.1 to 20 kHz. The electrochemical impedance spectroscopy value at 0.1 kHz and 20 kHz was determined.

The ambient temperature of the batteries when measuring the electrochemical impedance spectroscopy was 25° C.

(6-13) Measurement of Electrochemical Impedance Spectroscopy of Compact Non-Aqueous Secondary Battery (EIS Measurement 2)

The electrochemical impedance spectroscopy measurement was carried out using the apparatuses described in the above (6-12) on batteries that had been charged until the fiftieth cycle based on the method described in the above (6-11). As the measurement conditions, the amplitude was set at ±5 mV, and the frequency at 0.1 to 20 kHz. The electrochemical impedance spectroscopy value at 0.1 kHz and 20 kHz was determined. The ambient temperature of the batteries when measuring the electrochemical impedance spectroscopy was 25° C.

(6-14) Full-Charge Storage Test at 85° C. Of Compact Non-Aqueous Secondary Battery The durability performance of batteries that had been subjected to an initial charging/discharging treatment based on the method described in the above (6-4) during full-charge storage at 85° C. was evaluated. First, the ambient temperature of the batteries was set to 25° C., and charging was carried out by charging at a constant current corresponding to 1 C until 4.2 V was reached, and then at 4.2 V for a total of 3 hours. Next, this non-aqueous secondary battery was held in an 85° C. thermostatic bath for 4 hours. Then, the battery ambient temperature was returned to 25° C., and discharging was carried out at a constant current corresponding to 0.3 C until 3.0 V was reached. The discharge capacity at this stage was taken as the remaining capacity. Next, charging was carried out by charging at a constant current corresponding to 1 C until 4.2 V was reached, and then at 4.2 V for a total of 3 hours. Discharging was then carried out at a constant current corresponding to 0.3 C until 3.0 V was reached. The discharge capacity at this stage was taken as the 0.3 C recovery capacity. Next, charging was carried out by charging at a constant current corresponding to 1 C until 4.2 V was reached, and then at 4.2 V for a total of 3 hours. Discharging was then carried out at a constant current corresponding to 1.5 C until 3.0 V was reached. The discharge capacity at this stage was taken as the 1.5 C recovery capacity.

Examples 1 to 10 and Comparative Examples 1 to 7

Compact non-aqueous secondary batteries were produced based on the method described in the above (5-1) by combining the positive electrodes (P1) to (P5) and (P20), the negative electrodes (N1) to (N4) and (N14), and the electrolyte solutions (S1) to (S4). An initial charging/discharging treatment was carried out on these batteries based on the method described in the above (6-1). These batteries were also subjected to the measurement described in the above (6-5). The results are shown in Table 10.

TABLE 10

| | Positive Electrode | | Negative Electrode | | Electrolyte Solution | | 0.3 C | 10 C |
|---|---|---|---|---|---|---|---|---|
| | No. | Basis Weight [mg/cm$^2$] | No. | Basis Weight [mg/cm$^2$] | No. | Ion Conductivity [mS/cm] | Discharge Capacity [mAh] | Discharge Capacity [mAh] |
| Example 1 | P2 | 10.3 | N2 | 4.1 | S4 | 31.0 | 2.52 | 2.08 |
| Example 2 | P2 | 10.3 | N2 | 4.1 | S2 | 18.6 | 2.39 | 1.81 |

TABLE 10-continued

|  | Positive Electrode | | Negative Electrode | | Electrolyte Solution | | 0.3 C | 10 C |
| --- | --- | --- | --- | --- | --- | --- | --- | --- |
|  | No. | Basis Weight [mg/cm²] | No. | Basis Weight [mg/cm²] | No. | Ion Conductivity [mS/cm] | Discharge Capacity [mAh] | Discharge Capacity [mAh] |
| Example 3 | P3 | 26.0 | N3 | 12.0 | S4 | 31.0 | 6.10 | 2.75 |
| Example 4 | P3 | 26.0 | N3 | 12.0 | S2 | 18.6 | 5.96 | 2.20 |
| Example 5 | P2 | 10.3 | N2 | 4.1 | S3 | 24.0 | 2.47 | 1.94 |
| Example 6 | P5 | 10.0 | N2 | 4.1 | S2 | 18.6 | 3.05 | 2.35 |
| Example 7 | P4 | 39.3 | N4 | 18.0 | S2 | 18.6 | 9.05 | 2.12 |
| Example 8 | P4 | 39.3 | N4 | 18.0 | S4 | 31.0 | 9.15 | 2.96 |
| Example 9 | P20 | 48.2 | N14 | 21.4 | S2 | 18.6 | 12.71 | 1.12 |
| Example 10 | P20 | 48.2 | N14 | 21.4 | S4 | 31.0 | 13.02 | 2.40 |
| Comparative Example 1 | P1 | 6.1 | N1 | 2.3 | S4 | 31.0 | 1.55 | 1.31 |
| Comparative Example 2 | P1 | 6.1 | N1 | 2.3 | S2 | 18.6 | 1.54 | 1.10 |
| Comparative Example 3 | P1 | 6.1 | N1 | 2.3 | S1 | 9.0 | 1.51 | 0.94 |
| Comparative Example 4 | P2 | 10.3 | N2 | 4.1 | S1 | 9.0 | 2.35 | 1.07 |
| Comparative Example 5 | P3 | 26.0 | N3 | 12.0 | S1 | 9.0 | 5.92 | 0.92 |
| Comparative Example 6 | P4 | 39.3 | N4 | 18.0 | S1 | 9.0 | 8.82 | 0.80 |
| Comparative Example 7 | P20 | 48.2 | N14 | 21.4 | S1 | 9.0 | 13.18 | 0.90 |

From the above results, it can be seen that the non-aqueous secondary battery according to the present embodiment exhibits a higher discharge capacity than a conventional non-aqueous secondary battery even when an electrode having a high basis weight is used at a high rate.

Examples 11 to 18 and Comparative Example 8

Compact non-aqueous secondary batteries were produced based on the method described in the above (5-1) by combining the positive electrodes (P8) to (P12), the negative electrodes (N7) to (N10), and the electrolyte solutions (S1) and (S5) to (S7). An initial charging/discharging treatment was carried out on these batteries based on the method described in the above (6-1). These batteries were also subjected to the measurement described in the above (6-6). The results are shown in Table 11.

could not be obtained because a known carbonate-based electrolyte solution was used. Further, in Example 17, the discharge capacity retention rate during 10 C discharging was less than 65% despite using the electrolyte solution (S7) that has a high ion conductivity. Although this is sufficient for practical performance, it is predicted that the electrode, which had an insufficient electrode active material layer binding force to begin with, was affected by the high-polarity solvent as a result of not rolling with a roll press.

Examples 19 to 22 and Comparative Examples 9 and 10

Compact non-aqueous secondary batteries were produced based on the method described in the above (5-1) by combining the positive electrodes (P6) and (P7), the negative electrode (N5), and the electrolyte solutions (S1), (S8), and (S9). An initial charging/discharging treatment was carried out on these batteries based on the method described

TABLE 11

|  | Positive Electrode | | Negative Electrode | | Electrolyte Solution | | 1 C Discharge Capacity | 10 C Discharge Capacity |
| --- | --- | --- | --- | --- | --- | --- | --- | --- |
|  | No. | Porosity [%] | No. | Porosity [%] | No. | Ion Conductivity [mS/cm] |  |  |
| Example 11 | P8 | 27 | N7 | 27 | S7 | 35.0 | Excellent | Excellent |
| Comparative Example 8 | P8 | 27 | N7 | 27 | S1 | 9.0 | Excellent | Poor |
| Example 12 | P8 | 27 | N7 | 27 | S5 | 16.0 | Excellent | Good |
| Example 13 | P9 | 32 | N8 | 32 | S5 | 16.0 | Excellent | Good |
| Example 14 | P9 | 32 | N8 | 32 | S6 | 28.0 | Excellent | Excellent |
| Example 15 | P10 | 40 | N9 | 40 | S6 | 28.0 | Excellent | Excellent |
| Example 16 | P10 | 40 | N9 | 40 | S7 | 35.0 | Excellent | Excellent |
| Example 17 | P11 | 50 | N10 | 50 | S7 | 35.0 | Excellent | Fair |
| Example 18 | P12 | 32 | N8 | 32 | S5 | 16.0 | Excellent | Good |

From the above results, it can be seen that the non-aqueous secondary battery according to the present embodiment has a high rate characteristic. On the other hand, in Comparative Example 8, a sufficient rate characteristic in the above (6-1). These batteries were also subjected to the measurement described in the above (6-7). The results are shown in Table 12.

Examples 23 to 24 and Comparative Example 11

Compact non-aqueous secondary batteries were produced based on the method described in the above (5-1) by combining the positive electrodes (P6), the negative electrode (N6), and the electrolyte solutions (S1), (S8), and (S9). An initial charging/discharging treatment was carried out on these batteries based on the method described in the above (6-3). These batteries were also subjected to the measurement described in the above (6-8). The results are shown in Table 12.

Although a non-aqueous secondary battery that uses an alloy, such as $Li_4Ti_5O_{12}$, having a lower conductivity than a carbon material as the negative-electrode active material needs special effort, such as increasing the specific surface area or reducing the particle size, in order to obtain a conductive network in the negative-electrode active material layer, generally, it is known that the combination of an electrode having a low basis weight and a known carbonate-based electrolyte solution operates without any problems. On the other hand, like the non-aqueous secondary battery according to the present embodiment, when an electrode having a high basis weight and a non-aqueous electrolyte solution having high ion conductivity are combined, although sufficient for practical performance, it is predicted that the rate performance did not reach that of a carbon material due to particle properties that are different to those of a carbon material.

TABLE 13

|  | Electrolyte Solution | | Initial Charging Condition | Rate Test Capacity Retention Rate [%] |
|---|---|---|---|---|
|  | No. | Ion Conductivity [mS/cm] | | |
| Example 25 | S28 | 26.8 | (6-1) | 81 |
| Example 26 | S29 | 42.7 | (6-1) | 87 |
| Example 27 | S30 | 22.0 | (6-1) | 77 |
| Example 28 | S31 | 26.3 | (6-1) | 83 |
| Example 29 | S32 | 26.0 | (6-1) | 83 |
| Example 30 | S33 | 28.4 | (6-1) | 74 |
| Example 31 | S34 | 40.7 | (6-1) | 85 |
| Example 32 | S35 | 33.9 | (6-1) | 83 |
| Example 33 | S36 | 23.0 | (6-1) | 79 |

Examples 34 to 41

Compact non-aqueous secondary batteries were produced based on the method described in the above (5-1) by combining the positive electrode (P13), the negative electrode (N11), and the electrolyte solutions (S13), (S15) to (S17), and (S37) to (S40). An initial charging/discharging treatment was carried out on these batteries based on the method described in the above (6-1) or (6-2). These batteries were also subjected to the measurement described in the above (6-9) and (6-10). The results are shown in Table 14.

TABLE 12

|  | Positive Electrode | Negative Electrode | Electrolyte Solution | | 1 C Discharge Capacity | 3 C Discharge Capacity | 5 C Discharge Capacity | 10 C Discharge Capacity |
|---|---|---|---|---|---|---|---|---|
|  |  |  | No. | Ion Conductivity [mS/cm] | | | | |
| Example 19 | P6 | N5 | S8 | 16.0 | Excellent | Excellent | Excellent | Good |
| Example 20 | P7 | N5 | S8 | 16.0 | Excellent | Excellent | Excellent | Good |
| Example 21 | P6 | N5 | S9 | 35.0 | Excellent | Excellent | Excellent | Excellent |
| Example 22 | P7 | N5 | S9 | 35.0 | Excellent | Excellent | Excellent | Excellent |
| Comparative Example 9 | P6 | N5 | S1 | 9.0 | Excellent | Poor | Poor | Poor |
| Comparative Example 10 | P7 | N5 | S1 | 9.0 | Excellent | Good | Poor | Poor |
| Comparative Example 11 | P6 | N6 | S1 | 9.0 | Excellent | Good | Poor | Poor |
| Example 23 | P6 | N6 | S8 | 16.0 | Excellent | Good | Good | Poor |
| Example 24 | P6 | N6 | S9 | 35.0 | Excellent | Excellent | Good | Poor |

Examples 25 to 33

Compact non-aqueous secondary batteries were produced based on the method described in the above (5-1) by combining the positive electrodes (P13), the negative electrode (N11), and the electrolyte solutions (S28) to (S36). An initial charging/discharging treatment was carried out on these batteries based on the method described in the above (6-1). These batteries were also subjected to the measurement described in the above (6-9). The results are shown in Table 13.

Comparative Examples 12 and 13

Compact non-aqueous secondary batteries were produced based on the method described in the above (5-1) by combining the positive electrode (P13), the negative electrode (N11), and the electrolyte solutions (S41) and (S42). Although these batteries were subjected to an initial charging/discharging treatment based on the method described above in (6-2), and the measurement described above in (6-9), the discharge capacity retention rate was low, and the other measurements were not performed. The results are shown in Table 14.

TABLE 14

| | Electrolyte Solution | | Rate Test | Capacity Retention Rate at 50° C. [%] | | |
|---|---|---|---|---|---|---|
| | No. | Ion Conductivity [mS/cm] | Initial Charging Condition | Capacity Retention Rate [%] | 10 Cycles | 45 Cycles | 90 Cycles |

| | No. | Ion Conductivity [mS/cm] | Initial Charging Condition | Capacity Retention Rate [%] | 10 Cycles | 45 Cycles | 90 Cycles |
|---|---|---|---|---|---|---|---|
| Example 34 | S13 | 37.0 | (6-1) | 83 | 94 | 78 | 29 |
| Example 35 | S15 | 41.0 | (6-1) | 78 | 93 | 77 | 47 |
| Example 36 | S16 | 27.6 | (6-1) | 65 | 93 | 77 | 45 |
| Example 37 | S17 | 37.2 | (6-1) | 82 | 94 | 77 | 49 |
| Example 38 | S37 | 35.0 | (6-1) | 77 | 94 | 77 | 52 |
| Example 39 | S38 | 45.4 | (6-1) | 83 | 94 | 79 | 44 |
| Example 40 | S39 | 38.8 | (6-1) | 87 | 93 | 74 | 47 |
| Example 41 | S40 | 40.3 | (6-2) | 82 | 92 | 67 | 15 |
| Comparative Example 12 | S41 | 9.6 | (6-2) | 14 | Unmeasured | — | — |
| Comparative Example 13 | S42 | 7.3 | (6-2) | 10 | Unmeasured | — | — |

Examples 42 to 51

Compact non-aqueous secondary batteries were produced based on the method described in the above (5-1) by combining the positive electrode (P13), the negative electrode (N11), and the electrolyte solutions (S14), (S18), (S19), (S40), and (S43) to (S48). An initial charging/discharging treatment was carried out on these batteries based on the method described in the above (6-1). These batteries were also subjected to the measurement described in the above (6-9), (6-10) and (6-12). The results are shown in Table 15.

Examples 52 to 61 and Comparative Example 14

Compact non-aqueous secondary batteries were produced based on the method described in the above (5-1) by combining the positive electrodes (P15) to (P20), the negative electrodes (N12) to (N14), and the electrolyte solutions (S1), (S10) to (S12), and (S25) to (S27). An initial charging/discharging treatment was carried out on these batteries based on the method described in the above (6-4). These batteries were also subjected to the measurement described in the above (6-7), (6-11) and (6-13). The results are shown in Table 16.

TABLE 15

| | Electrolyte Solution | | Rate Test | Capacity Retention Rate at 50° C. [%] | | |
|---|---|---|---|---|---|---|
| | No. | Ion Conductivity [mS/cm] | Initial Charging Condition | Capacity Retention Rate [%] | 10 Cycles | 45 Cycles | 90 Cycles |
| Example 42 | S14 | 36.4 | (6-1) | 79 | 94 | 77 | 57 |
| Example 43 | S18 | 32.0 | (6-1) | 50 | 94 | 78 | 55 |
| Example 44 | S19 | 30.5 | (6-1) | 64 | 92 | 66 | 39 |
| Example 45 | S40 | 40.3 | (6-1) | 84 | 93 | 74 | 48 |
| Example 46 | S43 | 39.0 | (6-1) | 82 | 93 | 70 | 30 |
| Example 47 | S44 | 35.8 | (6-1) | 86 | 93 | 75 | 59 |
| Example 48 | S45 | 43.3 | (6-1) | 85 | 93 | 72 | 52 |
| Example 49 | S46 | 39.2 | (6-1) | 86 | 93 | 72 | 45 |
| Example 50 | S47 | 27.3 | (6-1) | 71 | 93 | 73 | 45 |
| Example 51 | S48 | 47.8 | (6-1) | 86 | 93 | 74 | 51 |

| | Impedance [Ω] | | | | | |
|---|---|---|---|---|---|---|
| | After Initial Charging | | After 25 Cycles | | After 100 Cycles | |
| | 20 kHz | 0.1 kHz | 20 kHz | 0.1 kHz | 20 kHz | 0.1 kHz |
| Example 42 | 1.4 | 2.9 | 3.3 | 6.0 | 8.9 | 20.1 |
| Example 43 | 1.8 | 3.0 | 5.5 | 7.3 | 12.0 | 18.0 |
| Example 44 | 1.6 | 2.8 | 5.6 | 7.5 | 15.0 | 22.0 |
| Example 45 | 0.9 | 2.1 | 4.8 | 8.1 | 10.7 | 29.0 |
| Example 46 | 0.8 | 2.0 | 4.9 | 7.9 | 13.3 | 33.9 |
| Example 47 | 1.2 | 2.5 | 3.1 | 7.7 | 10.6 | 27.6 |
| Example 48 | 0.8 | 2.0 | 3.1 | 5.9 | 9.0 | 20.4 |
| Example 49 | 1.0 | 2.2 | 4.1 | 7.1 | 10.2 | 31.8 |
| Example 50 | 1.3 | 2.9 | 4.8 | 8.8 | 10.9 | 26.4 |
| Example 51 | 0.9 | 2.0 | 3.9 | 6.9 | 9.8 | 27.0 |

TABLE 16

| | Positive Electrode | Negative Electrode | Electrolyte Solution No. | Ion Conductivity [mS/cm] | 1 C Discharge Capacity | 3 C Discharge Capacity |
|---|---|---|---|---|---|---|
| Example 52 | P15 | N12 | S10 | 40.0 | Excellent | Excellent |
| Example 53 | P15 | N12 | S11 | 27.0 | Excellent | Excellent |
| Example 54 | P16 | N12 | S12 | 17.0 | Excellent | Excellent |
| Example 55 | P19 | N13 | S11 | 27.0 | Excellent | Excellent |
| Example 56 | P17 | N12 | S10 | 40.0 | Excellent | Excellent |
| Example 57 | P17 | N12 | S11 | 27.0 | Excellent | Excellent |
| Comparative Example 14 | P15 | N12 | S1 | 9.0 | Excellent | Good |
| Example 58 | P18 | N12 | S11 | 27.0 | Excellent | Excellent |
| Example 59 | P20 | N14 | S25 | 43.8 | Excellent | Excellent |
| Example 60 | P20 | N14 | S26 | 37.4 | Excellent | Excellent |
| Example 61 | P20 | N14 | S27 | 45.2 | Excellent | Excellent |

| | 5 C Discharge Capacity | 10 C Discharge Capacity | Capacity Retention Rate of 49 cycles at 50° C. [%] | Impedance [Ω] 20 kHz | Impedance [Ω] 0.1 kHz |
|---|---|---|---|---|---|
| Example 52 | Excellent | Excellent | 76.0 | 4.4 | 29.0 |
| Example 53 | Excellent | Excellent | 77.5 | 3.6 | 19.0 |
| Example 54 | Excellent | Good | 79.0 | 5.4 | 26.0 |
| Example 55 | Excellent | Good | 77.2 | 7.1 | 31.0 |
| Example 56 | Excellent | Excellent | 68.3 | 10.0 | 69.0 |
| Example 57 | Excellent | Excellent | 60.5 | 8.5 | 45.0 |
| Comparative Example 14 | Poor | Poor | 87.0 | 11.0 | 35.0 |
| Example 58 | Excellent | Excellent | 62.5 | 9.2 | 48.0 |
| Example 59 | Excellent | Good | 65.0 | 2.1 | 12.8 |
| Example 60 | Excellent | Good | 65.4 | 2.1 | 12.3 |
| Example 61 | Excellent | Good | 75.5 | 1.9 | 21.0 |

Examples 62 to 65 and Comparative Example 15

A coin-type non-aqueous secondary batteries were produced based on the method described in the above (5-2) by combining the positive electrodes (P14) and (P19), the negative electrode (N13), and the electrolyte solutions (S20) to (S24). An initial charging/discharging treatment was carried out on these batteries based on the method described in the above (6-4). These batteries were also subjected to the measurement described in the above (6-14). The results are shown in Table 17.

TABLE 17

| | Positive Electrode | Negative Electrode | Electrolyte Solution No. | Ion Conductivity [mS/cm] | Remaining Capacity [mAh] | 0.3 C Recovery Capacity [mAh] | 1.5 C Recovery Capacity [mAh] |
|---|---|---|---|---|---|---|---|
| Example 62 | P14 | N13 | S20 | 15.5 | 8.45 | 9.02 | 8.41 |
| Example 63 | P14 | N13 | S22 | 17.4 | 8.11 | 8.81 | 8.31 |
| Example 64 | P14 | N13 | S23 | 23.1 | 8.09 | 8.93 | 7.41 |
| Example 65 | P19 | N13 | S24 | 23.5 | 7.04 | 8.56 | 8.13 |
| Comparative Example 15 | P14 | N13 | S21 | 10.4 | 7.76 | 8.40 | 6.48 |

This application claims the benefit of Japanese priority patent applications (Japanese Patent Application Nos. 2011-237707, 2011-237706, 2011-237765, and 2011-237808) filed at the Japan Patent Office on Oct. 28, 2011, and a Japanese priority patent application (Japanese Patent Application No. 2012-103331) filed at the Japan Patent Office on Apr. 27, 2012, the entire contents of which are incorporated herein by reference.

INDUSTRIAL APPLICABILITY

The non-aqueous secondary battery according to the present invention is expected to be utilized in portable devices, such as mobile phones, portable audio devices, personal computers, IC tags and the like, as well as an automotive rechargeable battery, such as in hybrid vehicles, plug-in hybrid vehicles, and electric vehicles, and as a household storage system.

REFERENCE SIGNS LIST

100 Lithium-ion secondary battery
110 Separator
120 Positive-electrode active material layer
130 Negative-electrode active material layer
140 Positive electrode current collector 150 Negative electrode current collector
160 Battery casing

The invention claimed is:
1. A non-aqueous secondary battery comprising:
an electrolyte solution that contains a lithium salt and a non-aqueous solvent,
a positive electrode, and
a negative electrode,
wherein a basis weight of a positive-electrode active material layer included in the positive electrode is 8 to 100 mg/cm$^2$, and/or, a basis weight of a negative-electrode active material layer included in the negative electrode is 3 to 46 mg/cm$^2$,
wherein the electrolyte solution has an ion conductivity at 25° C. of 20 mS/cm or more, and
wherein the electrolyte solution satisfies Composition 1:
Composition 1:
the electrolyte solution contains acetonitrile, a lithium salt and one or more compounds selected from the group consisting of compounds of Formula (1):

wherein R$^1$ and R$^2$ each independently represents an alkyl group optionally substituted with an aryl group or a halogen atom, or an aryl group optionally substituted with an alkyl group or a halogen atom, or R$^1$ and R$^2$ are bonded to each other to form a cyclic structure that may have an unsaturated bond with A, wherein A represents a divalent group having a structure represented by any one of the following formulae (2), (4) and (5):

wherein the electrolyte solution further contains one or more compounds selected from the group consisting of cyclic carbonates having a carbon-carbon double bond.
2. The non-aqueous secondary battery according to claim 1, wherein the electrolyte solution has an ion conductivity at 25° C. of 50 mS/cm or less.
3. The non-aqueous secondary battery according to claim 1, wherein the basis weight of the positive-electrode active material layer included in the positive electrode is 24 to 100 mg/cm$^2$, and/or, the basis weight of the negative-electrode active material layer included in the negative electrode is 10 to 46 mg/cm$^2$.
4. The non-aqueous secondary battery according to claim 1, wherein an electrode active material layer included in at least one of the positive electrode or the negative electrode has a porosity of 20 to 45%.
5. The non-aqueous secondary battery according to claim 1, wherein the positive-electrode active material layer included in the positive electrode has a porosity of 20 to 45%.
6. The non-aqueous secondary battery according to claim 1, wherein the negative-electrode active material layer included in the negative electrode has a porosity of 20 to 45%.
7. The non-aqueous secondary battery according to claim 1, wherein a content of acetonitrile in the non-aqueous solvent is 5 to 97 vol. %.
8. The non-aqueous secondary battery according to claim 1, wherein a content of acetonitrile in the non-aqueous solvent is 25 to 80 vol. %.
9. The non-aqueous secondary battery according to claim 1, wherein the compound represented by the Formula (1) is one or more compounds selected from the group consisting of ethylene sulfite, propylene sulfite, butylene sulfite, pentene sulfite, 1,3-propane sultone, 1,4-butane sultone and 1,3-propanediol sulfate.
10. The non-aqueous secondary battery according to claim 1, wherein the lithium salt is an inorganic lithium salt having a fluorine atom.
11. The non-aqueous secondary battery according to claim 10, wherein the inorganic lithium salt is LiPF$_6$.
12. The non-aqueous secondary battery according to claim 10, wherein the inorganic lithium salt is LiBF$_4$.
13. The non-aqueous secondary battery according to claim 10, wherein a content of the inorganic lithium salt based on a total amount of the electrolyte solution is 0.1 to 40 mass %.
14. The non-aqueous secondary battery according to claim 1, wherein the organic lithium salt is one or more organic lithium salts selected from the group consisting of lithium bis(oxalato)borate and lithium oxalato difluoroborate.
15. The non-aqueous secondary battery according to claim 1, wherein the positive electrode contains one or more materials selected from the group consisting of materials capable of doping and dedoping lithium ions as a positive-electrode active material, and the negative electrode contains one or more materials selected from the group consisting of materials capable of doping and dedoping lithium ions and metal lithium as a negative-electrode active material.
16. The non-aqueous secondary battery according to claim 15, wherein the positive electrode contains a lithium-containing compound as the positive-electrode active material.
17. The non-aqueous secondary battery according to claim 16, wherein the lithium-containing compound includes one or more compounds selected from the group consisting of a metal oxide having lithium and a metal chalcogenide having lithium.
18. The non-aqueous secondary battery according to claim 15, wherein the negative electrode contains as the negative-electrode active material one or more materials selected from the group consisting of metal lithium, a carbon material, and a material including an element capable of forming an alloy with lithium.
19. The non-aqueous secondary battery according to claim 15, wherein the negative electrode contains as the negative-electrode active material a material that dopes lithium ions at a lower potential than 1.4 V vs. Li/Li$^+$.
20. The non-aqueous secondary battery according to claim 1, wherein a positive electrode mixture of the positive electrode includes a positive-electrode active material, a conductive aid, a binder, and at least one compound selected from the group consisting of organic acids and organic acid salts.

21. The non-aqueous secondary battery according to claim 20, wherein the compound includes a divalent or greater organic acid or organic acid salt.

22. The non-aqueous secondary battery according to claim 20, wherein a thickness of a positive-electrode active material layer produced from the positive electrode mixture is 50 to 300 μm.

23. The non-aqueous secondary battery according to claim 1, wherein the positive electrode and/or the negative electrode are an electrode formed by coating the positive-electrode active material layer and/or the negative-electrode active material layer on an electrode substrate formed by coating a conductive layer that includes a conductive material on an electrode current collector.

24. The non-aqueous secondary battery according to claim 23, wherein the conductive layer includes a conductive material and a binder.

25. A method for producing the non-aqueous secondary battery according to claim 1, comprising the step of performing initial charging of 0.001-0.3 C.

26. The method for producing the non-aqueous secondary battery according to claim 25, wherein the initial charging is performed by charging at a constant voltage during a part of the charging process.

* * * * *